(12) United States Patent
Ishii et al.

(10) Patent No.: US 10,178,320 B2
(45) Date of Patent: Jan. 8, 2019

(54) IMAGE DISPLAY TERMINAL, IMAGE DISPLAY METHOD, AND NON-TRANSITORY COMPUTER READABLE RECORDING MEDIUM STORING PROGRAM

(71) Applicant: Olympus Corporation, Hachioji-shi, Tokyo (JP)

(72) Inventors: Kensuke Ishii, Tokyo (JP); Saori Matsumoto, Tokyo (JP); Arata Shinozaki, Tokyo (JP); Yoshitaka Sato, Tokyo (JP)

(73) Assignee: Olympus Corporation, Tokyo (JP)

( * ) Notice: Subject to any disclaimer, the term of this patent is extended or adjusted under 35 U.S.C. 154(b) by 103 days.

(21) Appl. No.: 15/134,865

(22) Filed: Apr. 21, 2016

(65) Prior Publication Data

US 2016/0309093 A1    Oct. 20, 2016

Related U.S. Application Data

(63) Continuation of application No. PCT/JP2014/076046, filed on Sep. 30, 2014.

(30) Foreign Application Priority Data

Oct. 24, 2013   (JP) ................... 2013-221409

(51) Int. Cl.
*H04N 5/232* (2006.01)
*H04N 5/77* (2006.01)

(52) U.S. Cl.
CPC ..... *H04N 5/23293* (2013.01); *H04N 5/23216* (2013.01); *H04N 5/77* (2013.01)

(58) Field of Classification Search
CPC ........... H04N 1/00442; H04N 1/00445; H04N 1/00448; H04N 1/00453; H04N 1/00456;
(Continued)

(56) References Cited

U.S. PATENT DOCUMENTS 6,396,537 B1 * 5/2002 Squilla .............. G06F 17/30265
348/14.02
7,251,790 B1 * 7/2007 Drucker ............ G06F 17/30849
348/333.05
(Continued)

FOREIGN PATENT DOCUMENTS

JP    2001-242529    9/2001
JP    2002-185835    6/2002
(Continued)

OTHER PUBLICATIONS

Machine English Translation for JP2009239397A (Oct. 15, 2009) (Year: 2009).*

(Continued)

*Primary Examiner* — Nelson D. Hernández Hernández
(74) *Attorney, Agent, or Firm* — John C. Pokotylo; Pokotylo Patent Services

(57) ABSTRACT

An image display terminal includes a memory configured to store a plurality of sample images and display time of the sample images; a display interface configured to display live images continuously output from an imaging module and the sample images; and a display control unit, wherein the display control unit performs a control to cause the live images to be displayed on the display interface, and cause a first image of the plurality of sample images to be displayed on the display interface for the display time, and when the display time has elapsed, the display control unit performs a control to cause the first image to be non-displayed, and cause a second image of the plurality of sample images, different from the first image and non-displayed, to be displayed on the displayer interface for the display time.

48 Claims, 34 Drawing Sheets

(58) Field of Classification Search
CPC .......... H04N 1/00461; H04N 5/23293; H04N 5/23216; H04N 5/77; G06F 17/30274; G06F 17/30849; G08B 13/19693
See application file for complete search history.

(56) References Cited

U.S. PATENT DOCUMENTS

| | | | |
|---|---|---|---|
| 8,228,413 B2* | 7/2012 | Ellenby | G03B 17/24 348/207.11 |
| 2003/0063194 A1* | 4/2003 | Nishiyama | H04N 1/00132 348/207.1 |
| 2005/0190280 A1* | 9/2005 | Haas | G06F 3/0485 348/333.05 |
| 2007/0031141 A1* | 2/2007 | Tanaka | G02B 26/004 396/287 |
| 2007/0109429 A1 | 5/2007 | Suzuki et al. | |
| 2010/0302409 A1* | 12/2010 | Matas | H04N 5/772 348/231.99 |
| 2016/0006945 A1* | 1/2016 | Furuhashi | G06F 17/30247 348/239 |
| 2016/0234432 A1* | 8/2016 | Matsunaga | H04N 5/23222 |

FOREIGN PATENT DOCUMENTS

| | | |
|---|---|---|
| JP | 2004-325937 | 11/2004 |
| JP | 2006-166193 | 6/2006 |
| JP | 2006-344168 | 12/2006 |
| JP | 2007-027945 | 2/2007 |
| JP | 2007-159095 | 6/2007 |
| JP | 2008-135994 | 6/2008 |
| JP | 2009-010472 | 1/2009 |
| JP | 2009-239397 | 10/2009 |
| JP | 2009239397 A * | 10/2009 |
| JP | 2012-253669 | 12/2012 |
| JP | 2013-126012 | 6/2013 |
| JP | 2013-141131 | 7/2013 |

OTHER PUBLICATIONS

International Search Report to corresponding International Patent Application No. PCT/JP2014/076046, dated Nov. 11, 2014 (2 pgs.), with translation (2 pgs.).

* cited by examiner

| SAMPLE IMAGE | DISPLAY TIME (min) |
|---|---|
| A | 1 |
| B | 1 |
| C | 1 |
| D | 1 |
| E | 1 |
| F | 1 |
| ⋮ | ⋮ |

IMAGE DISPLAY TERMINAL, IMAGE DISPLAY METHOD, AND NON-TRANSITORY COMPUTER READABLE RECORDING MEDIUM STORING PROGRAM

This application is a continuation application based on a PCT International Application No. PCT/JP2014/076046, filed on Sep. 30, 2014, whose priority is claimed on Japanese Patent Application No. 2013-221409, filed on Oct. 24, 2013. The contents of the PCT International Application and the Japanese Patent Application are incorporated herein by reference.

BACKGROUND OF THE INVENTION

Field of the Invention

The present invention relates to a technique that displays an image on a display interface.

Description of Related Art

When a user performs image capturing, it is convenient to display an image indicating or suggesting a composition or the like which becomes a reference of image capturing. For example, such a technique of displaying an image is disclosed in Japanese Unexamined Patent Application, First Publication No. 2007-27945, that imaging conditions information indicating imaging conditions is transmitted to an image server from a client, and an image corresponding to the imaging conditions information is transmitted to the client from the image server. The image received from the image server is displayed on the client.

SUMMARY OF THE INVENTION

According to a first aspect of the invention, an image display terminal includes a memory configured to store a plurality of sample images and display time of the sample images; a display interface configured to display live images continuously output from an imaging module and the sample images stored in the memory; and a display control unit, wherein the display control unit performs a control to cause the live images to be displayed on the display interface, and cause a first image of the plurality of sample images to be displayed on the display interface for the display time, and when the display time has elapsed, the display control unit performs a control to cause the first image which is being displayed on the display interface to be non-displayed, and cause a second image of the plurality of sample images, which is different from the first image and non-displayed, to be displayed on the displayer interface for the display time.

According to a second aspect of the invention, the image display terminal according to the first aspect may further include a display time-setting unit configured to determine the display time and stores the determined display time in the memory.

According to a third aspect of the invention, the image display terminal according to the second aspect may further include an user interface configured to receive an operation of a user, wherein the display time-setting unit determines the display time according to the operation of the user and stores the determined display time in the memory.

According to a fourth aspect of the invention, in the image display terminal according to the third aspect, in a case where the operation of the user is an operation of selecting the sample image, the display time-setting unit may determine the display time of the selected sample image and store the determined display time in the memory in association with the selected sample image.

According to a fifth aspect of the invention, the image display terminal according to the first aspect may further include an user interface configured to receive an operation of a user, wherein in a case where the operation of the user is an operation of selecting the sample images which are being displayed, the display control unit may perform a control to cause the selected sample images which are being displayed on the display interface to be non-displayed.

According to a sixth aspect of the invention, the image display terminal according to the first aspect may further include an user interface configured to receive an operation of a user, wherein the display control unit may perform a control to cause all the sample images which are being displayed on the display interface to be non-displayed, in a case where the operation of the user is an operation of instructing non-display of the sample images.

According to a seventh aspect of the invention, the image display terminal according to the first aspect may further include an user interface configured to receive an operation of a user, wherein in a case where the operation of the user is an operation of selecting the sample images which are being displayed, the display control unit may perform a control to cause the selected sample images which are being displayed to be displayed even after the display time has elapsed.

According to an eighth aspect of the invention, the image display terminal according to the first aspect may further include a time measurement unit configured to measure a period of time when the sample image is displayed only while the live image is being displayed, wherein the display control unit determines whether or not the display time has elapsed based on the period of time measured by the time measurement unit.

According to a ninth aspect of the invention, the image display terminal according to any one of the first to eighth aspects may further include a searching unit configured to generate search query information indicating an image searching condition; and a communication interface configured to transmit the search query information to an external device and receives a search result image searched based on the search query information from the external device, wherein the memory stores the received search result image as the sample image.

According to a tenth aspect of the invention, the image display terminal according to the ninth aspect may further include a display time-setting unit configured to determine the display times based on the number of the search result images and store the determined display times in the memory.

According to an eleventh aspect of the invention, in the image display terminal according to the tenth aspect, the display time-setting unit may determine the display time for each of the sample images to be shorter as the number of the search result images becomes larger.

According to a twelfth aspect of the invention, in the image display terminal according to the tenth aspect, the display time-setting unit may determine the display times of the sample images to be zero in a case where the number of the search result images is smaller than a predetermined number.

According to a thirteenth aspect of the invention, in the image display terminal according to the ninth aspect, the display control unit may perform a control to cause a larger number of the sample images to be simultaneously displayed, in a case where the number of the search result images becomes larger.

According to a fourteenth aspect of the invention, in the image display terminal according to the ninth aspect, the display control unit may perform a control to cause any one of the sample images which are being displayed to be selected, based on a result obtained by comparing identification information of the sample images which are being displayed with identification information of the sample images stored in the memory by searching, and may perform a control to cause the selected sample image to be non-displayed and the sample images stored in the memory by searching to be displayed on the display interface for the display times.

According to a fifteenth aspect of the invention, in the image display terminal according to the ninth aspect, the searching unit may generate the search query information whenever a first predetermined time has elapsed, and the communication interface may transmit the search query information to an external device whenever a second predetermined time has elapsed.

According to a sixteenth aspect of the invention, the image display terminal according to the ninth aspect may further include an user interface configured to receive an operation of a user, wherein in a case where the operation of the user is an operation of designating an image searching condition, the searching unit may generate the search query information based on the designated image searching condition.

According to a seventeenth aspect of the invention, in the image display terminal according to the sixteenth aspect, the display control unit may perform a control to display the image searching condition together with the live image to be displayed on the display interface.

According to an eighteenth aspect of the invention, the image display terminal according to the ninth aspect may further include an user interface configured to receive an operation of a user, wherein in a case where the operation of the user is an operation of selecting the sample image which is being displayed, the searching unit may generate the search query information for searching an image similar to the selected sample image.

According to a nineteenth aspect of the invention, the image display terminal according to the ninth aspect may further include an user interface configured to receive an operation of a user, wherein in a case where the operation of the user is an operation of selecting the sample image which is being displayed, the searching unit may store search query information indicating an image searching condition that the selected sample image is searched in the memory in association with the selected sample image, and in a case where the operation of the user is an operation of designating an image searching condition, the searching unit may search the sample image corresponding to the search query information indicating the designated image searching condition from the sample images stored in the memory.

According to a twentieth aspect of the invention, the image display terminal according to the first aspect may further include an image selection unit configured to select the sample image to display from the sample images stored in the memory, wherein the display control unit performs a control to cause the selected sample image to be displayed on the display interface.

According to a twenty-first aspect of the invention, in the image display terminal according to the twentieth aspect, in a case where a plurality of identical sample images is stored in the memory, the image selection unit may select one sample image from among the plurality of identical sample images.

According to a twenty-second aspect of the invention, in the image display terminal according to the twentieth aspect, in a case where a plurality of similar sample images is stored in the memory, the image selection unit may select one sample image from among the plurality of similar sample images.

According to a twenty-third aspect of the invention, in the image display terminal according to the twentieth aspect, the memory may store imaging conditions information indicating imaging conditions when the sample images are captured in association with the sample images, and the image selection unit may select only the sample images corresponding to the imaging conditions information indicating imaging conditions which can apply to the imaging module from among the imaging conditions information stored in the memory.

According to a twenty-fourth aspect of the invention, the image display terminal according to the first aspect may further include a display position-setting unit configured to determine display positions of the sample images and stores the determined display positions in the memory, wherein the display control unit performs a control to cause the sample images to be displayed at the determined display positions on the display interface.

According to a twenty-fifth aspect of the invention, in the image display terminal according to the twenty-fourth aspect, the display position-setting unit may determine positions in a region different from a region where the live image is displayed as the display positions of the sample images.

According to a twenty-sixth aspect of the invention, in the image display terminal according to the twenty-fourth aspect, the display position-setting unit may determine positions in a region where the live image is displayed but not near a central position of the region, as the display positions of the sample images.

According to a twenty-seventh aspect of the invention, in the image display terminal according to the twenty-fourth aspect, the display position-setting unit may determine positions in a region where the live image is displayed, but not near a region where a main subject is displayed, as the display positions of the sample images.

According to a twenty-eighth aspect of the invention, in the image display terminal according to the first aspect, the display control unit may perform a control to cause information relating to the sample images together with the sample images to be displayed on the display interface.

According to a twenty-ninth aspect of the invention, in the image display terminal according to the first aspect, the display control unit may perform a control to display a first time or a second time on the display interface, wherein the first time is a time until the sample image which is being displayed becomes non-displayed, and the second time is a time elapsed from a time point when the sample image is displayed.

According to a thirtieth aspect of the invention, in the image display terminal according to the twenty-ninth aspect, the display control unit may perform a control to cause the sample images processed based on the first time or the second time to be displayed on the display interface.

According to a thirty-first aspect of the invention, in the image display terminal according to the first aspect, the memory may store imaging conditions information indicating imaging conditions when the sample images are captured in association with the sample images, and the image display terminal may further include: an user interface that receives an operation of a user; and an imaging condition-setting unit that sets imaging conditions indicated by the imaging conditions information corresponding to the selected sample image for the imaging module, in a case where the operation of the user is an operation of selecting the sample image which is being displayed.

According to a thirty-second aspect of the invention, the image display terminal according to the first aspect may further include an user interface configured to receive an operation of a user, wherein in a case where the operation of the user is an operation of selecting the sample image which is being displayed, the display control unit may perform a control to cause advice for capturing the selected sample image to be displayed on the display interface.

According to a thirty-third aspect of the invention, the image display terminal according to the first aspect may further include an user interface configured to receive an operation of a user, wherein the display control unit performs a control to cause the sample image which is non-displayed to be displayed on the display interface, in a case where the operation of the user is an operation of instructing re-display of the sample image which is in the non-displayed.

According to a thirty-fourth aspect of the invention, in the image display terminal according to the thirty-third aspect, the display control unit may perform a control to cause a list of the plurality of sample images which are non-displayed to be displayed on the display interface, in a case where the operation of the user is an operation of instructing re-display of the plurality of sample images which are non-displayed.

According to a thirty-fifth aspect of the invention, in the image display terminal according to the thirty-third aspect, the display control unit may perform a control to cause the sample image which is non-displayed most recent to be displayed on the display interface, in a case where the operation of the user is an operation of instructing re-display of the sample image which is non-displayed.

According to a thirty-sixth aspect of the invention, the image display terminal according to the first aspect may further include an user interface configured to receive an operation of a user, wherein the display control unit performs a control to cause the sample image which is being displayed to be non-displayed, in a case where the operation of the user is an operation of instructing autofocus.

According to a thirty-seventh aspect of the invention, the image display terminal according to the first aspect may further include a motion detection unit configured to detect an orientation or a motion of the image display terminal, wherein the display control unit performs a control to cause the sample images to be displayed on the display interface while changing display positions of the sample images which are being displayed, according to the detected orientation or motion.

According to a thirty-eighth aspect of the invention, the image display terminal according to the first aspect may further include a motion detection unit configured to detect an orientation or a motion of the image display terminal, wherein the display control unit performs a control to cause the sample images which are being displayed on the display interface to be non-displayed according to the detected orientation or motion.

According to a thirty-ninth aspect of the invention, the image display terminal according to the first aspect may further include an imaging module configured to continuously capture the live images.

According to a fortieth aspect of the invention, the image display terminal according to the first aspect may further include a number determination unit configured to determine the number of sample images to be simultaneously displayed and stores the determined number in the memory, wherein the display control unit performs a control to cause the determined number of sample images to be displayed on the display interface.

According to a forty-first aspect of the invention, the image display terminal according to the first aspect may further include a display size determination unit configured to determine display sizes of the sample images and stores the determined display sizes in the memory, wherein the display control unit performs a control to cause the sample images in the determined display sizes to be displayed on the display interface.

According to a forty-second aspect of the invention, the image display terminal according to the first aspect may further include a brightness determination unit configured to determine brightness of the sample images and stores the determined brightnesses in the memory, wherein the display control unit performs a control to cause the sample images at the determined brightness to be displayed on the display interface.

According to a forty-third aspect of the invention, the image display terminal according to the first aspect may further include a transparency determination unit configured to determine transparency of the sample images and stores the determined transparencies in the memory, wherein the display control unit performs a control to cause the sample images at the determined transparencies to be displayed on the display interface.

According to a forty-fourth aspect of the invention, in the image display terminal according to the first aspect, the display control unit may perform a control to cause the sample images to be displayed on the display interface while changing display positions of the sample images which are being displayed.

According to a forty-fifth aspect of the invention, in the image display terminal according to the first aspect, the display control unit may perform a control to cause the sample images to be displayed on the display interface with effect of fading in or fading out the sample images.

According to a forty-sixth aspect of the invention, in the image display terminal according to the first aspect, the display control unit may perform a control to cause the sample images be displayed on the display interface with effect of enlarging or reducing the sample images which are being displayed.

According to a forty-seventh aspect of the invention, an image display method includes the steps of displaying live images continuously output from an imaging module on a display interface; displaying the sample images stored in the memory for the display times on the display interface, in a state where a plurality of sample images and display times of the sample images are stored in the memory; causing the sample images which are being displayed to be non-displayed on the display interface, after the display time has elapsed; and displaying other sample images different from the sample images which are non-displayed on the display interface for the display time.

According to a forty-eighth aspect of the invention, a non-transitory computer readable recording medium storing a program causing a computer to execute the steps of: displaying live images continuously output from an imaging module; displaying the sample images stored in the memory for the display times, in a state where a plurality of sample images and display times of the sample images are stored in the memory; causing the sample images which are being displayed to be non-displayed, after the display time has elapsed; and displaying other sample images different from the sample images which are non-displayed for the display time.

DETAILED DESCRIPTION OF THE INVENTION

Hereinafter, embodiments of the invention will be described with reference to the accompanying drawings.

First Embodiment

Figures 1, 2:
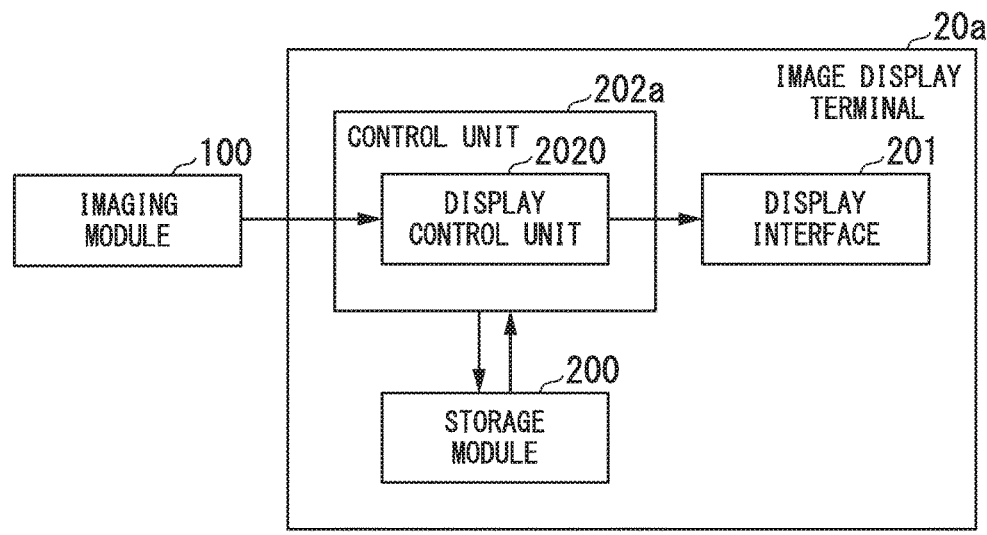
FIG. 1 is a block diagram illustrating a configuration of an image display terminal according to a first embodiment of the invention.
FIG. 2 is a reference diagram illustrating data stored in a storage module in the first embodiment of the invention.

First, a first embodiment of the invention will be described. FIG. 1 shows a configuration of an image display terminal 20*a* according to this embodiment. The image display terminal 20*a* includes a storage module 200 (memory), a display interface 201, and a control unit 202*a*. The image display terminal 20*a* is connected to an imaging module 100 that continuously captures live images (image data for displaying live images) in a wired communication manner or a wireless communication manner. The live image refers to an individual image that forms a moving image.

The storage module 200 (storage device) is a non-volatile recording medium or a volatile recording medium, such as a memory which is built in the image display terminal 20*a*. The storage module 200 (storage device) stores plural sample images (image data for displaying sample images) and display times (setting times) of the sample images.

The sample image refers to a reference image for imaging, which is an image for instructing or suggesting composition or the like to a user. The display time refers to a period of time when a display state of a sample image is continued. The display interface 201 (display module or display device) displays live images which are continuously output from the imaging module 100 and sample images stored in the storage module 200.

The control unit 202*a* is a control module (control device) such as a central processing unit (CPU), and controls an operation of the image display terminal 20*a*. In this embodiment, the control unit 202*a* includes a display control unit 2020. The display control unit 2020 performs a control for importing live images output from the imaging module 100 and displaying the imported live images and sample images stored in the storage module 200 on the display interface 201. Specifically, the display control unit 2020 performs a control so that the display interface 201 displays the live images and displays the sample images for display times stored in the storage module 200. After the display times have elapsed, the display control unit 2020 performs a control so that the display interface 201 causes the sample images which are being displayed to enter a non-display state. Further, the display control unit 2020 performs a control so that the display interface 201 displays sample images different from the sample images in the non-display state for display times stored in the storage module 200. When performing a control so that the display interface 201 displays the sample images different from the sample images which are in the non-display state, the display control unit 2020 performs a control so that the display interface 201 displays the sample images immediately after the sample images which are being displayed enter the non-display state or after an arbitrary time has elapsed after the sample images which are being displayed enter the non-display state, for example.

FIG. 2 shows an example of data stored in the storage module 200. Sample images and display times are stored in the storage module 200 as pairs. That is, the sample images and the display times are stored in the storage module 200 in an associated state. In FIG. 2, the same display times are given to all the sample images, and the display times are one minute. As another example, the display times may be set to be different from each other in the respective sample images. Alternatively, the same display times are given to a group that includes plural sample images, and the display times may be set to be different from each other in the respective groups.

The storage module 200 may store a program for controlling an operation of the control unit 202*a* and necessary data. Functions of the control unit 202*a* may be realized as software functions by causing a computer of the image display terminal 20*a* to read and execute the program for controlling the operation of the control unit 202*a*, for example. Further, the program may be provided through a "computer-readable recording medium" such as a flash memory, for example. Further, the above-described program may be input to the image display terminal 20*a* by being transmitted to the image display terminal 20*a* from a computer in which the program is stored in a storage device or the like through a transmission medium or using a transmission wave in a transmission medium. Here, the "transmission medium" that transmits the program refers to a medium having a function for transmitting information, for example, a network (communication network) such as the Internet or a communication line such as a telephone line. Further, the above-described program may realize a part of the above-described functions. In addition, the above-described program may be a so-called a differential file (differential program) capable of realizing the above-described functions by combination with a program which is stored in a computer in advance.

Figure 3:
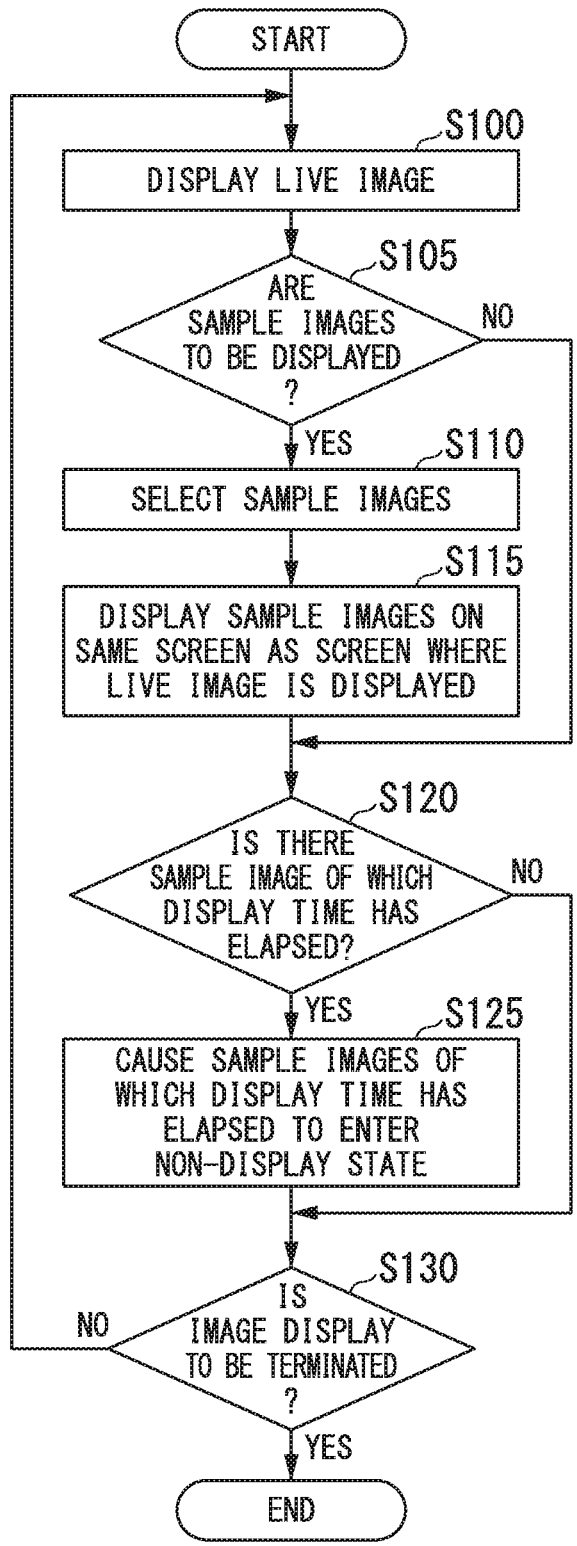
FIG. 3 is a flowchart illustrating a procedure of an operation of the image display terminal according to the first embodiment of the invention.

Next, the operation of the image display terminal 20*a* will be described. FIG. 3 shows an example of a procedure of the operation of the image display terminal 20*a*. In the example shown in FIG. 3, at a time point when an operation of displaying a live image is started, sample images are stored in the storage module 200. The sample images stored in the storage module 200 may be images searched on a network, as described in other embodiments.

If the operation of displaying the live image is started, the display control unit 2020 imports a live image output from the imaging module 100, and displays the imported live image on the display interface 201 (step S100). As a result, the display interface 201 displays the live image. The operation of importing the live image in the display control unit 2020 is performed in synchronization with an operation of performing imaging in the imaging module 100. For example, the display control unit 2020 imports live images at the same cycle as a cycle (frame) at which the imaging module 100 performs imaging. Whenever the process of step S100 is performed once, a live image of one frame or live images of plural frames are displayed.

After the live image is displayed, the display control unit 2020 determines whether to display sample images (step S105). For example, in a case where no sample image is displayed on the display interface 201, it is determined that the sample images are to be displayed. Further, for example, in a case where the number of sample images to be displayed at the same time is determined, and in a case where the number of sample images displayed on the display interface 201 is smaller than the number of sample images to be displayed at the same time, it is determined that the sample images are to be displayed. In a case where it is determined that the sample images are not to be displayed, a process of step S120 is performed.

In a case where it is determined that the sample images are to be displayed, the display control unit 2020 selects sample images to be displayed on the display interface 201 from the sample images stored in the storage module 200 (step S110). The display control unit 2020 may prohibit the selection of the already displayed sample images until all the sample images are displayed. Alternatively, the display control unit 2020 may prohibit the selection of the sample images within a predetermined time after the sample images are displayed or within a predetermined time after the sample images enter a non-display state. Thus, it is possible to preferentially display sample images that are not yet displayed. In a case where all of the sample images are displayed once or more, the display control unit 2020 may preferentially select sample images having a relatively small number of times of display.

The display control unit 2020 may select sample images to be displayed on the display interface 201 based on a flag indicating whether or not each sample image is displayed. The flag is stored in the storage module 200 to pair with the sample image, that is, in a state of being associated with the sample image. For example, a value of the flag is different between a case where the sample image is already displayed and a case where the sample image is not yet displayed. The value of the flag for the sample image which is already displayed is a value indicating that the display is finished. The value of the flag for the sample image which is not yet displayed is a value indicating that the display is not performed. The value of the flag may be a value indicating the number of times of the display of the sample image.

After the sample images are selected, the display control unit 2020 reads the selected sample images from the storage module 200 to output the result to the display interface 201, and causes the display interface 201 to display the sample images on the same screen as a screen where a live image is displayed (step S115). Here, the display control unit 2020 starts measurement of a period of time when the sample images are displayed on the display interface 201. It is sufficient if a timing when the measurement of the period of time is started is a timing based on a timing when the sample images are displayed on the display interface 201. For example, the timing when the measurement of the period of time is started may be immediately after or immediately before the timing when the sample images are displayed on the display interface 201. The measurement of the period of time when the sample images are displayed on the display interface 201 is performed for each sample image. The display control unit 2020 may be provided with a timer, or the display control unit 2020 may control a timer provided outside the control unit 202*a*.

Figure 4A:
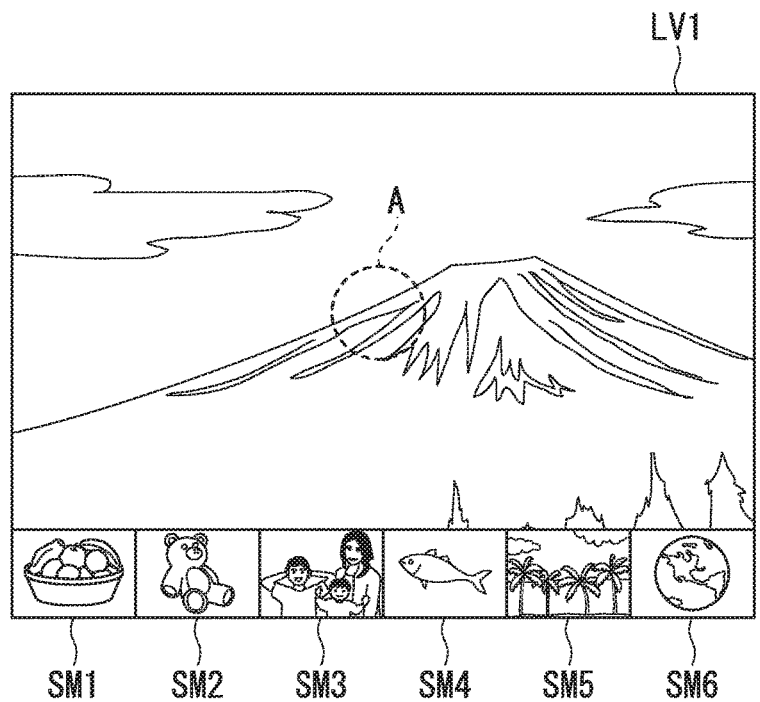
FIG. 4A is a reference diagram illustrating a screen where a live image and sample images are displayed in the first embodiment of the invention.
Figure 4B:
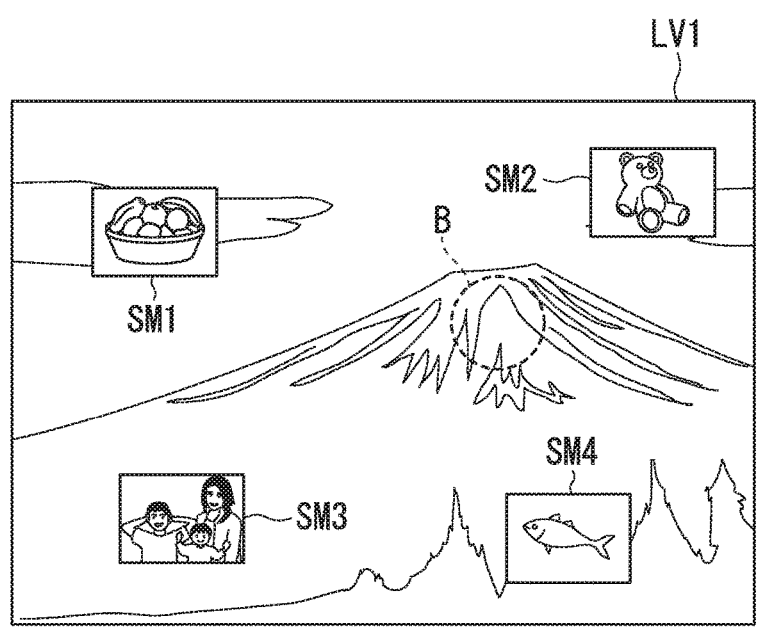
FIG. 4B is a reference diagram illustrating a screen where a live image and sample images are displayed in the first embodiment of the invention.

FIGS. 4A and 4B show examples of screens on which a live image and sample images are displayed. In FIG. 4A, a live image LV1 and sample images SM1 to SM6 are displayed on a screen of the display interface 201. The live image LV1 and the sample images SM1 to SM6 may be displayed so that the respective images are arranged so as not to overlap each other, or so that the sample images SM1 to SM6 are displayed on the live image LV1 in an overlapping manner.

In FIG. 4A, the sample images SM1 to SM6 are displayed in a lower part of the screen. A position where the sample images are displayed is not limited to the lower part of the screen. The sample images may be displayed in any position among an upper part, a right end part, and a left end part of the screen. Further, the position where the sample images are displayed is not limited to the end parts of the screen. In FIG. 4B, the live image LV1 and the sample images SM1 to SM4 are displayed on the screen of the display interface 201 in an overlapping manner, in which the sample images SM1 to SM4 are displayed in arbitrary positions on the screen. In any example shown in FIGS. 4A and 4B, the number of sample images to be displayed is not limited to six or four.

After the sample images are displayed, the display control unit 2020 determines whether or not there is a sample image for which a time elapsed from the time point when the measurement of the period of time is started exceeds a display time stored in the storage module 200, with respect to the sample images which are being displayed. That is, the display control unit 2020 determines whether or not there is a sample image of which the display time has elapsed (step S120).

In a case where the time elapsed from the time point when the measurement of the period of time is started does not exceed the display time stored in the storage module 200 with respect to all the sample images which are being displayed, it is determined that there is no sample image of which the display time has elapsed. In this case, a process of step S130 is performed.

In a case where the time elapsed from the time point when the measurement of the period of time is started exceeds the display time stored in the storage module 200 with respect to one or more sample images among the sample images which are being displayed, it is determined that there is a sample image of which the display time has elapsed. In this case, the display control unit 2020 performs a control so that the display interface 201 causes the sample images of which the display times have elapsed among the sample images which are being displayed to enter a non-display state (step S125). As a result, the display interface 201 causes the sample images which are being displayed to enter the non-display state. That is, the display interface 201 deletes the sample images which are being displayed from the screen of the display interface 201.

The display control unit 2020 performs the processes of steps S115 to S125 with respect to the identical sample images, to thereby cause the display interface 201 to display the sample images for the display times. That is, the display control unit 2020 performs a control so that the display interface 201 displays the sample images in step S115, and performs, after the display times have elapsed after the sample images are displayed, a control so that the display interface 201 causes the sample images which are being displayed to enter the non-display state in step S125.

After the sample images enter the non-display state, the display control unit 2020 determines whether to terminate the image display (step S130). In a case where an event for terminating the image display occurs, for example, in a case where there is a termination instruction from a user or in a case where a predetermined time has elapsed, it is determined that the image display is to be terminated. In this case, the display of the live image and the sample images is terminated.

In a case where the image display is not to be terminated, the live image is displayed in step S100. Then, the above-described operations are performed again. In a case where the sample images are displayed in step S115 immediately after the sample images enter the non-display state in step S125, the sample images in the non-display state in step S125 and the sample images displayed in step S115 are different from each other. Accordingly, the display control unit 2020 causes the sample images to enter the non-display state in step S125, and then, displays the sample images different from the sample images in the non-display state on the display interface 201 in step S115.

In this embodiment, while the operation of displaying the live image is continued, at least two sample images are displayed, in which after one of the two sample images enters a non-display state, the other one enters a display state. Even in a case where three or more sample images are displayed, a case where one of arbitrary two sample images enters a non-display state and then the other one enters a display state is included in a range of the concept of this embodiment.

Next, a modification example of the first embodiment of the invention will be described.

First Modification Example

Figure 5:
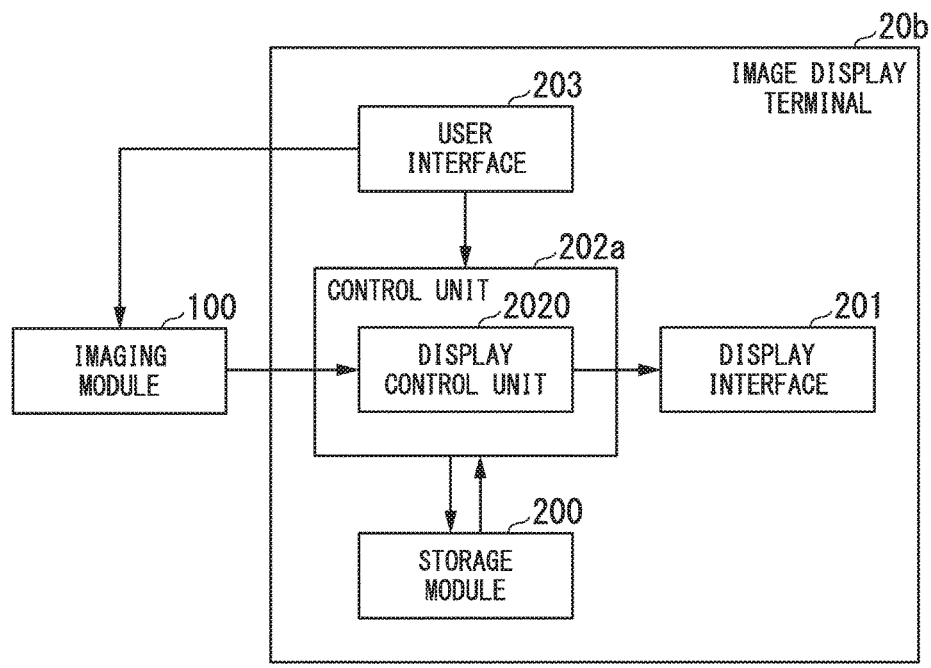
FIG. 5 is a block diagram illustrating a configuration of an image display terminal according to a first modification example of the first embodiment of the invention.

A first modification example will be described. In this modification example, a user may operate an image display terminal to perform image capturing. FIG. 5 shows a configuration of an image display terminal 20*b* of this modification example. The image display terminal 20*b* includes the storage module 200, the display interface 201, the control unit 202*a*, and an user interface 203. Description of the components already described above will not be repeated.

The user interface 203 (operation module or operation device) receives a user's operation. The user interface 203 is an interface capable of inputting any information to the image display terminal 20*b* according to the user's operation. The user interface 203 may be buttons, switches, keys, or the like, or may be a touch panel integrated with a display interface.

The user may input an imaging instruction (release) with respect to the imaging module 100 through the user interface 203. If the imaging instruction is input through the user interface 203, a signal based on the imaging instruction is output to the imaging module 100, and thus, the imaging module 100 captures an image (still image) and outputs the captured image. For example, the storage module 200 of the image display terminal 20*b* stores the image output from the imaging module 100. Alternatively, in a case where an imaging terminal different from the image display terminal 20*b* includes the imaging module 100 and a storage module, the storage module of the imaging terminal stores the image output from the imaging module 100.

Further, the user may input an autofocus instruction with respect to the imaging module 100 through the user interface 203. If the autofocus instruction is input through the user interface 203, a signal based on the autofocus instruction is output to the imaging module 100, and the imaging module 100 performs focus adjustment. Further, in a case where the user's operation received through the user interface 203 is an operation for instructing autofocus, the display control unit 2020 performs a control so that the display interface 201 causes sample images which are being displayed to enter a non-display state. Thus, it is possible to perform a control so that no trouble is in the sample images when the user checks a focus state of a live image. The sample images which are in the non-display state may be all the sample images which are being displayed, or may be, in a region where the live image is displayed, sample images which are displayed at a central position of the region or sample images which are displayed at a position closest to the central position of the region.

In a case where the autofocus instruction is released, the sample images which are in the non-display state may be displayed again. For example, in a case where the user's operation received through the user interface 203 is an operation of instructing release of the autofocus, the display control unit 2020 performs a control so that the display interface 201 displays the sample images which are in the non-display state when the operation of instructing the autofocus is performed. Thus, the user can check the sample images again.

Second Modification Example

Figure 6:
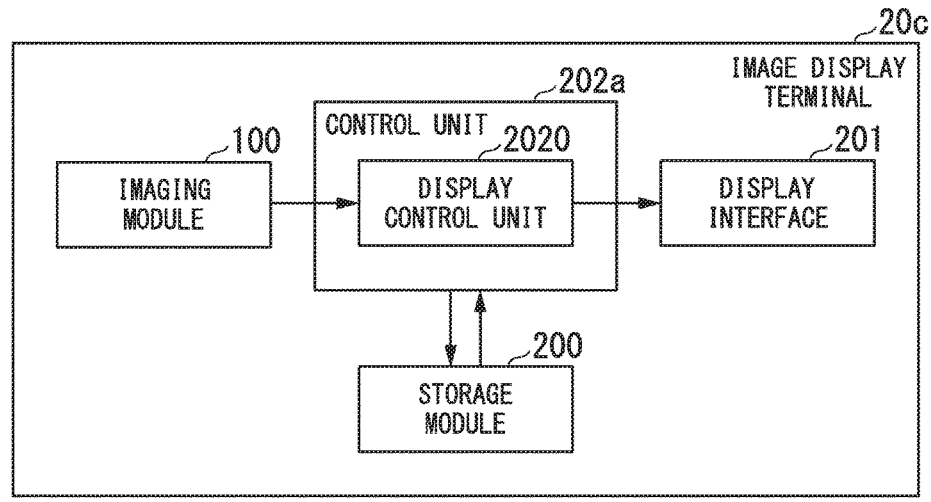
FIG. 6 is a block diagram illustrating a configuration of an image display terminal according to a second modification example of the first embodiment of the invention.

Next, a second modification example of the first embodiment of the invention will be described. In this modification example, an image display terminal performs imaging. FIG. 6 shows a configuration of an image display terminal 20*c* of this modification example. The image display terminal 20*c* includes the imaging module 100, the storage module 200, the display interface 201, and the control unit 202*a*. Since these components are already described, descriptions thereof will not be repeated. The image display terminal 20*c* may include the user interface 203. According to this modification example, the image display terminal 20*c* may perform imaging and displaying of live images and sample images. The image display terminal 20*c* may be used as an imaging terminal.

According to this embodiment, an image display terminal is provided, including the storage module 200 that stores plural sample images and display times of the sample images; the display interface 201 that displays live images continuously output from the imaging module 100 and the sample images stored in the storage module 200; and the display control unit 2020 that performs a control so that the display interface 201 displays the live images, displays the sample images for the display times, causes the sample images which are being displayed to enter a non-display state after the display times have elapsed, and displays the sample images other than the sample images which are in the non-display state for the display times.

Further, according to this embodiment, an image display method is provided, including: a step S100 of displaying live images continuously output from an imaging module 100, by a display interface 201; a step S115 of displaying, in a state where a plurality of sample images and display times of the sample images are stored in a storage module 200, the sample images stored in the storage module 200 for the display times, by the display interface 201; a step of 125 of causing each sample image which is being displayed to enter a non-display state after the display time has elapsed, by the display interface 201; and a step of S115 of displaying each sample image other than the sample image which is in the non-display state for the display time, by the display interface 201.

Furthermore, according to this embodiment, a computer-readable non-volatile recording medium is provided that stores a program for causing a computer to execute: a step S100 of displaying live images continuously output from an imaging module 100; a step of S115 of displaying, in a state where a plurality of sample images and display times of the sample images are stored in a storage module 200, the sample images stored in the storage module 200 for the display times; a step S125 of causing each sample image which is being displayed to enter a non-display state after the display time has elapsed; and a step S115 of displaying each sample image other than the sample image which is in the non-display state for the display time.

In this embodiment, since the sample images which are displayed are automatically switched, it is possible to reduce a user's burden related to an operation of switching the images. Further, by displaying the sample images, it is possible to display images which are references for imaging. Thus, it is possible to make the user aware of a composition or the like that the user does not know.

Second Embodiment

Figure 7:
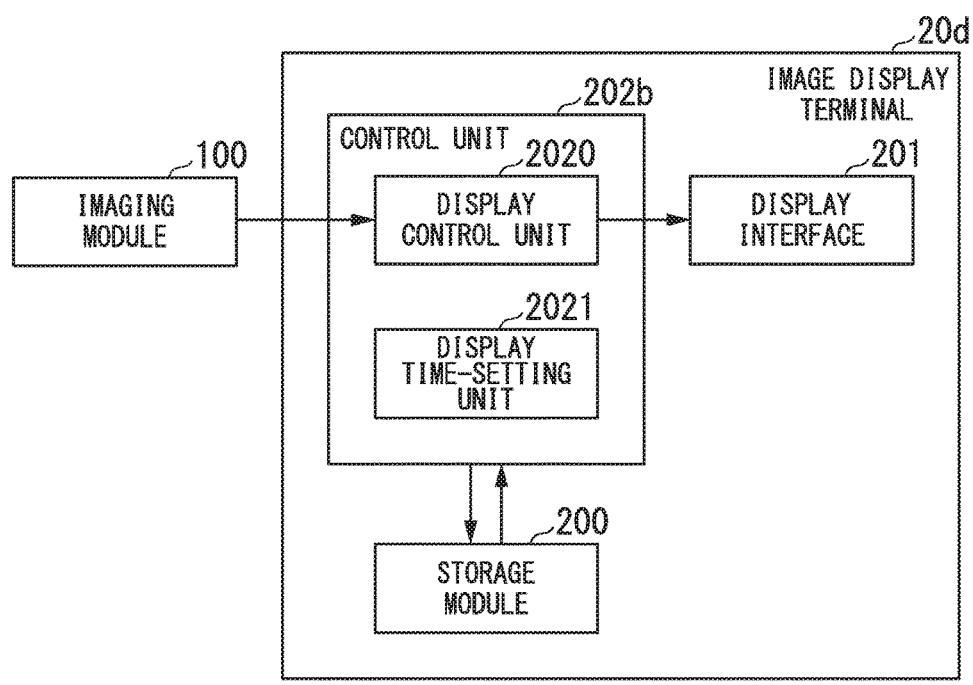
FIG. 7 is a block diagram illustrating a configuration of an image display terminal according to a second embodiment of the invention.

Next, a second embodiment of the invention will be described. FIG. 7 shows a configuration of an image display terminal 20*d* according to this embodiment. The image display terminal 20*d* includes the storage module 200, the display interface 201, and a control unit 202*b*. Description of the components already described above will not be repeated. The control unit 202*b* includes the display control unit 2020 and a display time-setting unit 2021. The display time-setting unit 2021 determines display times, and stores the determined display times in the storage module 200.

Figure 8:
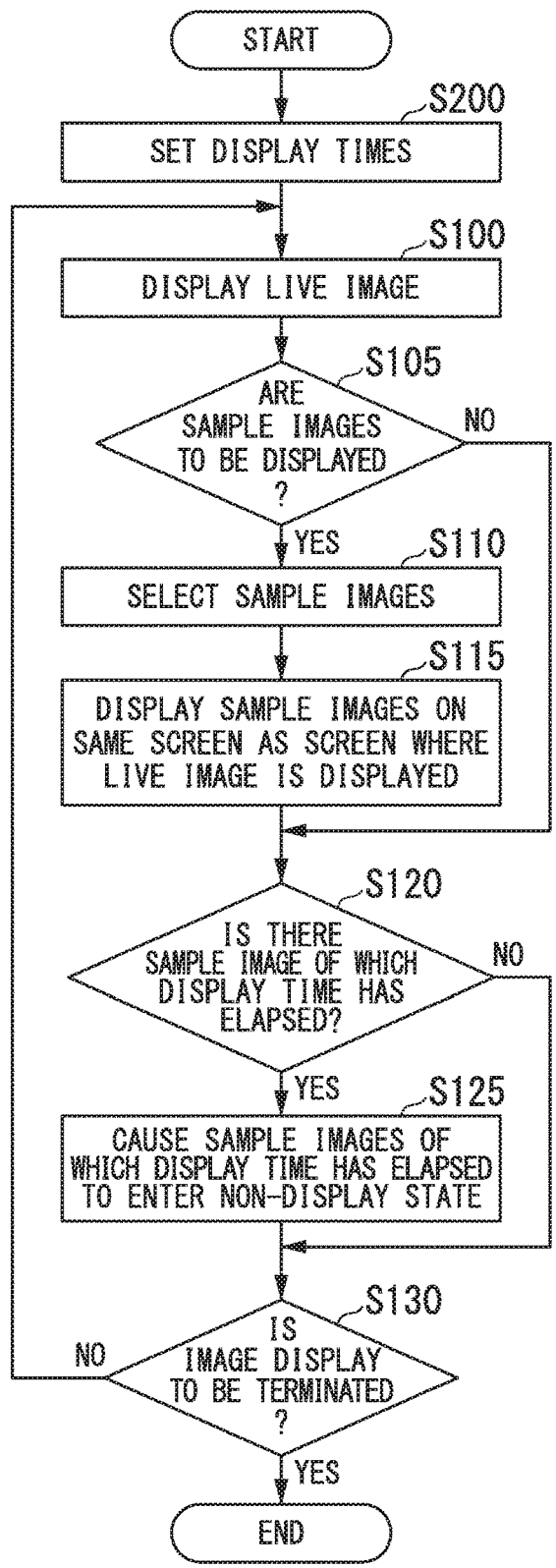
FIG. 8 is a flowchart illustrating a procedure of an operation of the image display terminal according to the second embodiment of the invention.

Then, an operation of the image display terminal 20*d* will be described. FIG. 8 shows an example of a procedure of the operation of the image display terminal 20*d*. Hereinafter, different points compared with the operation shown in FIG. 3 will be described.

If an operation of displaying a live image is started, the display time-setting unit 2021 determines display times of sample images, and stores the determined display times in the storage module 200 in association with the sample images (step S200). Thus, the display times of the sample images are set.

The display time may be the same predetermined time between the sample images, or may be a random time which is different for each sample image. The display time-setting unit 2021 may generate a value in a procedure regulated by a program, and may determine the generated value as the display time. Alternatively, in a case where the image display terminal 20*d* includes a communication interface, the display time-setting unit 2021 may acquire a value from an external device through the communication interface, and may determine the acquired value as the display time.

In a case where the image display terminal 20*d* includes the user interface 203, a user may select a display time determination method. In a case where the user selects the display time determination method, the display time-setting unit 2021 determines the display time based on the method selected by the user. For example, in a case where the user selects a method for determining a predetermined time as the display time, the display time-setting unit 2021 determines the predetermined time as the display time. The user may designate a specific predetermined time. Further, in a case where the user selects a method for determining a random time as the display time, the display time-setting unit 2021 generates a random time for each sample image, and determines the generated time as the display time.

After the display times of the sample images are set, a live image is displayed in step S100. Since the processes of step S100 to S130 are already described, description thereof will not be repeated.

In FIG. 8, the setting of the display times (step S200) is initially performed, but a timing when the setting of the display times (step S200) is performed is not limited thereto. The setting of the display times (step S200) may be performed before the display of the sample images (step S115).

According to this embodiment, it is possible to set the display times of the sample images to arbitrary times.

Third Embodiment

Figure 9:
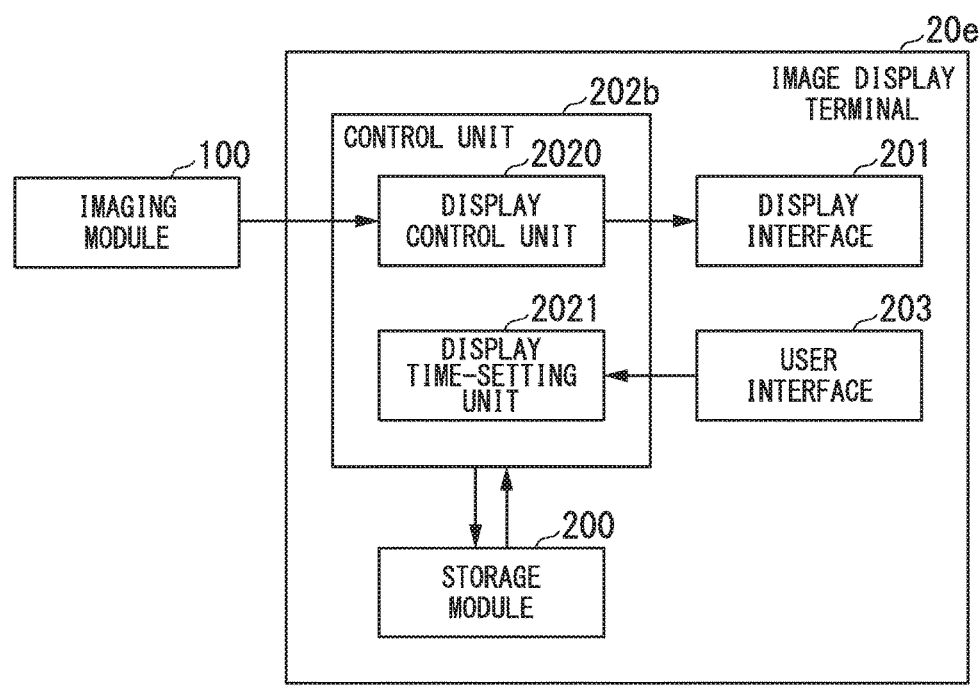
FIG. 9 is a block diagram illustrating a configuration of an image display terminal according to a third embodiment of the invention.

Next, a third embodiment of the invention will be described. FIG. 9 shows a configuration of an image display terminal 20*e* according to this embodiment. The image display terminal 20*e* includes the storage module 200, the display interface 201, the control unit 202*b*, and the user interface 203. Description of the components already described above will not be repeated. In this embodiment, the display time-setting unit 2021 determines display times according to a user's operation, and stores the determined display times in the storage module 200.

Figure 10:
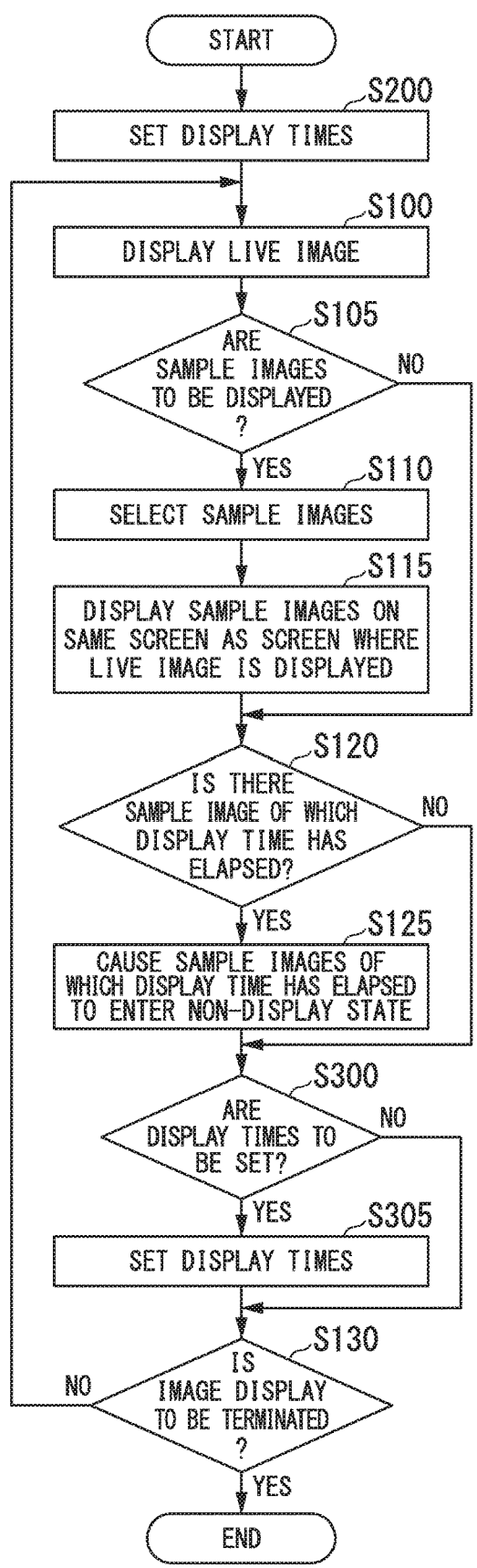
FIG. 10 is a flowchart illustrating a procedure of an operation of the image display terminal according to the third embodiment of the invention.

Next, an operation of the image display terminal 20*e* will be described. FIG. 10 shows an example of a procedure of the operation of the image display terminal 20*e*. Hereinafter, different points compared with the operation shown in FIG. 8 will be described.

After sample images enter a non-display state in step S125, the display time-setting unit 2021 determines whether to set display times (step S300). In a case where an instruction for performing the setting of the display times are not input through the user interface 203, it is determined that the display times are not to be set. In this case, the process of step S130 is performed.

In a case where the instruction for performing the setting of the display times are input through the user interface 203, it is determined that the display times are to be set. In this case, the display time-setting unit 2021 determines the display times according to content input through the user interface 203, and stores the determined display times in the storage module 200 (step S305). Thus, it is possible to change the display times set in step S200.

After the display times are set, the process of step S130 is performed. Since the processes of steps S100 to S130 are already described, description thereof will not be repeated.

A timing when the setting (step S305) of the display times are performed is not limited to the timing shown in FIG. 10. The setting (step S305) of the display times may be performed after the setting (step S200) of the display times. Alternatively, the image display terminal 20*e* according to this embodiment may perform the operation shown in FIG. 8, and may set the display times according to a user's operation in the setting (step S200) of the display times.

The user may designate sample images, and may set display times of the sample images. For example, in a case where the user's operation received through the user interface 203 is an operation of selecting sample images, the display time-setting unit 2021 determines display times of the selected sample images, and stores the determined display times in the storage module 200 in association with the selected sample images. Thus, it is possible to set display times of specific sample images.

The operation of selecting the sample images may be an operation of selecting sample images which are being displayed.

That is, display times of the sample images which are being displayed may be changed. In a case where the display interface 201 is a touch panel, the operation of selecting the sample images which are being displayed may be tapping of the sample images. Thus, it is possible to set display times of sample images by a simple operation.

According to this embodiment, it is possible to set display times of sample images according to a user's instruction.

Fourth Embodiment

Figure 11:
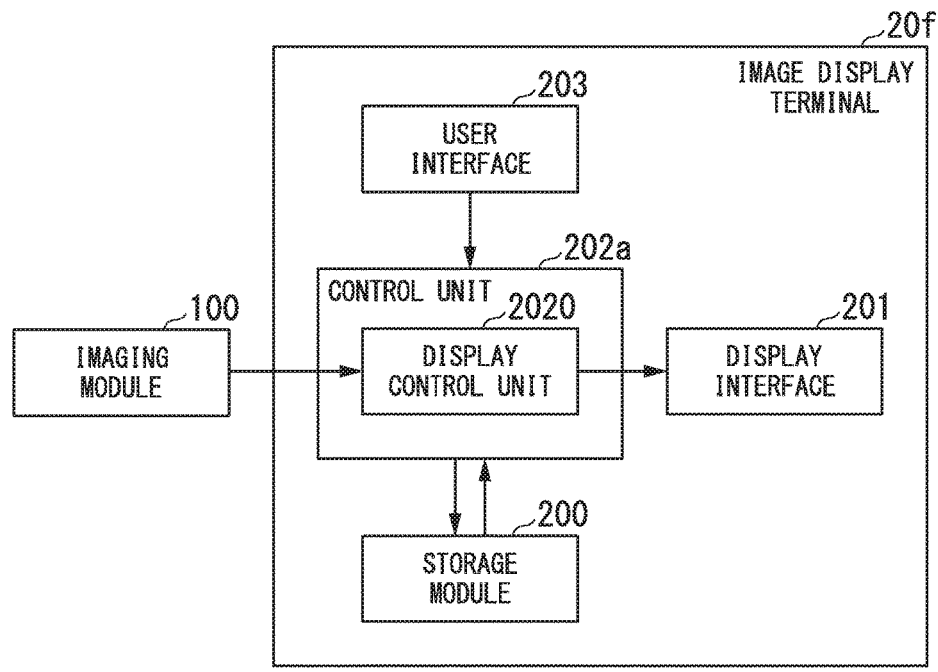
FIG. 11 is a block diagram illustrating a configuration of an image display terminal according to a fourth embodiment of the invention.

Next, a fourth embodiment of the invention will be described. FIG. 11 shows a configuration of an image display terminal 20*f* according to this embodiment. The image display terminal 20*f* includes the storage module 200, the display interface 201, the control unit 202*a*, and the user interface 203. Description of the components already described above will not be repeated. In this embodiment, the user interface 203 receives a user's operation with respect to sample image which are being displayed or sample images which are in a non-display state.

For example, in a case where the user's operation received through the user interface 203 is an operation of selecting sample images which are being displayed, the display control unit 2020 performs a control so that the display interface 201 causes the selected sample images which are being displayed to enter the non-display state. Thus, it is possible to immediately cause the sample images designated by the user to enter the non-display state. The user's operation may be a flick of the sample images which are being displayed. For example, in a case where the sample images are flicked out of the screen of the display interface 201 by the user's operation, the sample images enter the non-display state.

Alternatively, in a case where the user's operation received through the user interface 203 is an operation of instructing non-display of sample images, the display control unit 2020 performs a control so that the display interface 201 causes all the sample images which are being displayed to enter the non-display state. Thus, it is possible to immediately cause all the sample images which are being displayed to enter the non-display state.

The image display terminal 20e according to the third embodiment may realize the same function. For example, in a case where the user's operation received through the user interface 203 is an operation of instructing non-display of sample images, the display time-setting unit 2021 determines display times of the selected sample images to an extremely small value (for example, 0), and stores the determined display times in the storage module 200 in association with the selected sample images. Thus, the sample images enter the non-display state in step S125 in FIG. 3 or the like immediately after the user's operation.

Alternatively, in a case where the user's operation received through the user interface 203 is an operation of selecting sample images which are being displayed, the display control unit 2020 performs a control so that the display interface 201 displays the selected sample images which are being displayed even after display times have elapsed.

That is, in a case where the sample images which are being displayed are selected, the process of step S125 shown in FIG. 3 or the like is not performed with respect to the selected sample images. Thus, the sample images are continuously displayed even after the display times have elapsed. Accordingly, it is possible to continuously make the sample images designated by the user remain on the screen of the display interface 201.

The image display terminal 20e according to the third embodiment may realize the same function. For example, in a case where the user's operation received through the user interface 203 is an operation of instructing non-display of sample images, the display time-setting unit 2021 determines display times of the selected sample images to an extremely large value (for example, a maximum value that can be set as the display time), and stores the determined display times in the storage module 200 in association with the selected sample images.

Alternatively, in a case where the user's operation received through the user interface 203 is an operation of selecting sample images which are being displayed, the display control unit 2020 performs a control so that the display interface 201 displays advice for capturing the selected sample images. Thus, it is possible to provide information useful for capturing of the sample images to the user. The advice for capturing the sample images may be information relating to a composition such as an imaging angle or an angle of view, or may be information relating to imaging setting such as a shutter speed. The information may be acquired from an exchangeable image file format (Exif) associated with the sample images.

Alternatively, in a case where the user's operation received through the user interface 203 is an operation of instructing re-display of sample images which are in a non-display state, the display control unit 2020 performs a control so that the display interface 201 displays the sample images which are in the non-display state. Thus, it is possible to satisfy a user's desire to view the sample images which are in the non-display state again.

For example, in a case where the user's operation received through the user interface 203 is an operation of instructing re-display of sample images which are in a non-display state, the display control unit 2020 performs a control so that the display interface 201 displays a list of plural sample images which are in a non-display state. Specifically, the display control unit 2020 performs a control so that the display interface 201 displays the list of the plural sample images which are in the non-display state at a timing before a time point when the operation of instructing the re-display of the sample images which are in the non-display state is performed. After the list of the sample images is displayed, in a case where an operation of selecting some sample images from the list is received through the user interface 203, the display control unit 2020 may control the display interface 201 to cause sample images which are not selected in the list of the sample images to enter a non-display state.

Alternatively, in a case where the user's operation received through the user interface 203 is an operation of instructing re-display of sample images which are in a non-display state, the display control unit 2020 performs a control so that the display interface displays sample images which are in a non-display state immediately before. Specifically, the display control unit 2020 performs a control so that the display interface 201 displays sample images which are in a non-display state at a timing closest to a time point when the operation of instructing the re-display of the sample images which are in the non-display state is performed.

According to this embodiment, it is possible to change the state of the sample images which are being displayed or the state of the sample images which are in the non-display state according to the user's operation.

Fifth Embodiment

Figure 12:
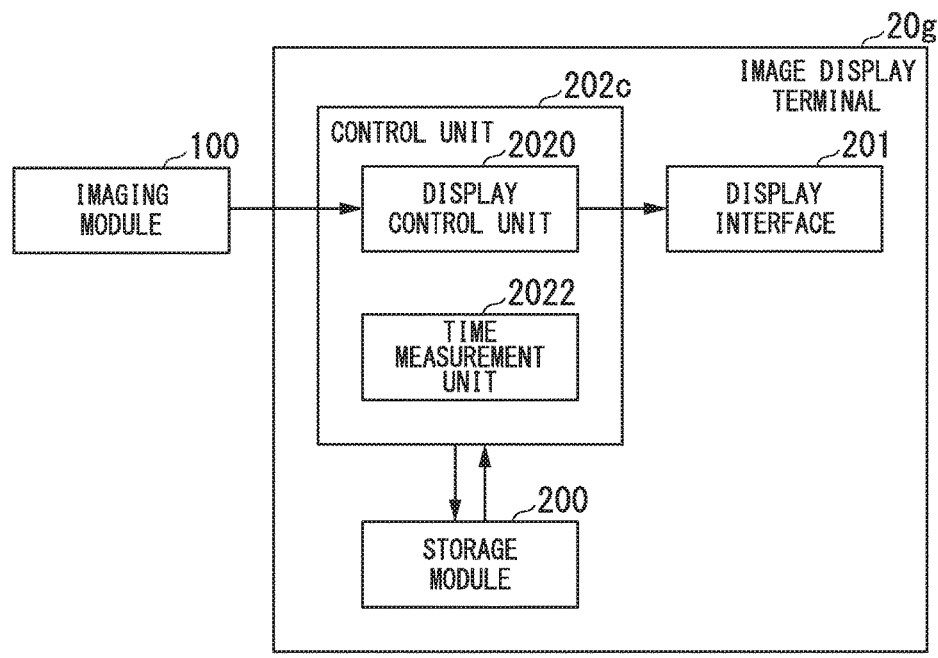
FIG. 12 is a block diagram illustrating a configuration of an image display terminal according to a fifth embodiment of the invention.

Next, a fifth embodiment of the invention will be described. FIG. 12 shows a configuration of an image display terminal 20g according to this embodiment. The image display terminal 20g includes the storage module 200, the display interface 201, and a control unit 202c. Description of the components already described above will not be repeated. The control unit 202c includes the display control unit 2020 and a time measurement unit 2022. The time measurement unit 2022 measures a period of time when a sample image is displayed only while a live image is being displayed. The display control unit 2020 determines whether or not display times have elapsed based on the period of time measured by the time measurement unit 2022.

In this embodiment, the time measurement unit 2022 performs the measurement only while the image display terminal 20g is being operated in an image display mode (imaging mode) where a live image is displayed, and does not perform the measurement while the image display terminal 20g is being operated in other modes. The other modes include a setting mode where setting is performed with respect to the image display terminal 20g. Further, in a case where the image display terminal 20g is configured so that the storage module 200 stores an image (still image) captured by the imaging module 100, the other modes include a reproduction mode where an image stored in the imaging module 100 is reproduced to be displayed on the display interface 201.

After the mode of the image display terminal 20g is switched from the image display mode to a different mode, the time measurement unit 2022 stops the measurement once. Then, the time measurement unit 2022 starts the measurement again at a time point when the mode of the image display terminal 20g is switched to the image display mode. While the time measurement unit 2022 stops the measurement once, the measured period of time is retained.

Figure 13:
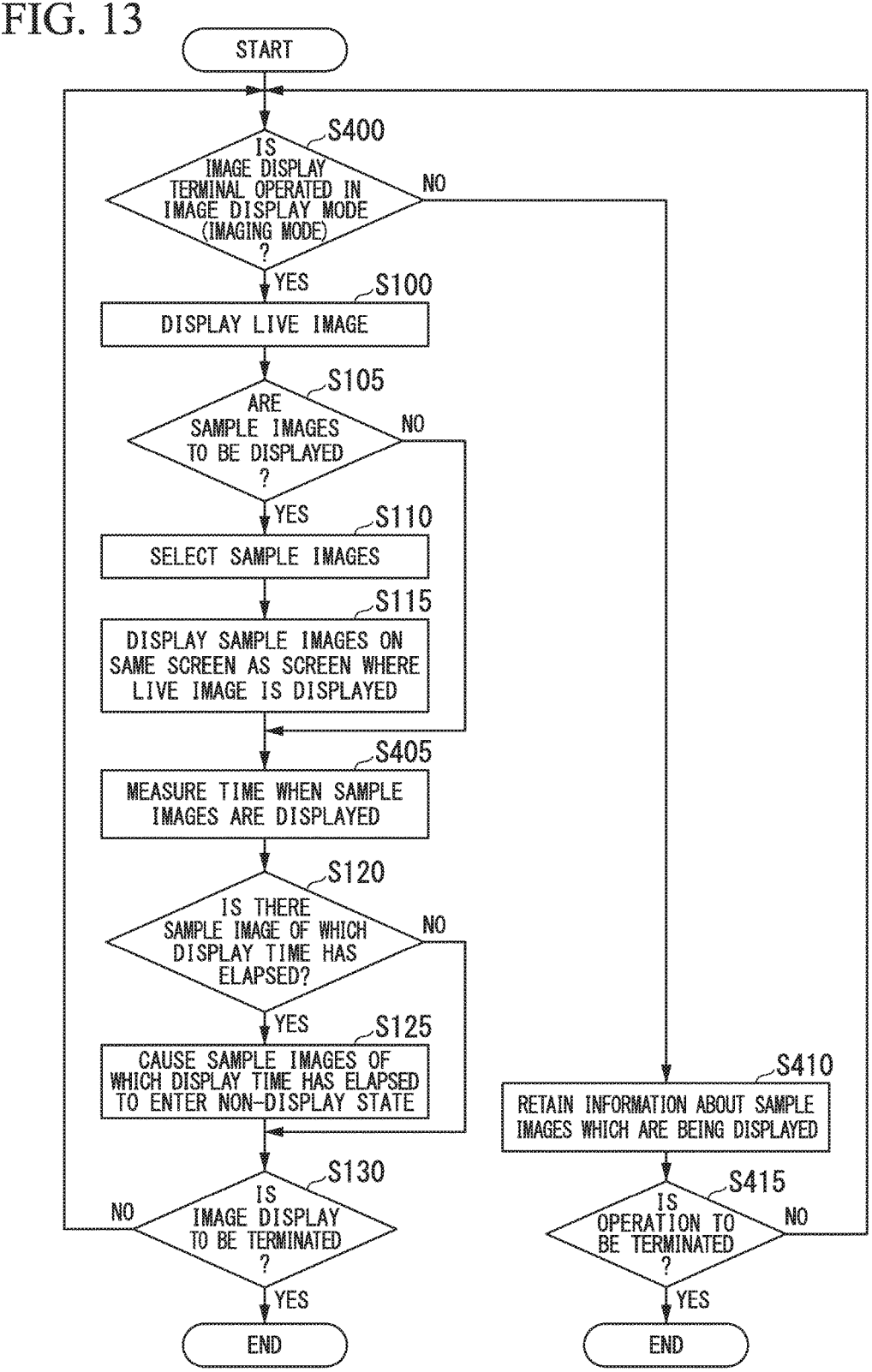
FIG. 13 is a flowchart illustrating a procedure of an operation of the image display terminal according to the fifth embodiment of the invention.

Next, an operation of the image display terminal 20g will be described. FIG. 13 shows an example of a procedure of the operation of the image display terminal 20g. Hereinafter, different points compared with the operation shown in FIG. 3 will be described.

After a power source of the image display terminal 20g is supplied so that the image display terminal 20g starts the operation, the display control unit 2020 determines whether or not the image display terminal 20g is operated in the image display mode (step S400). In a case where it is determined that the image display terminal 20g is operated in the image display mode, the process of step S100 is performed. Further, in a case where it is determined that the image display terminal 20g is operated in a mode other than the image display mode, a process of step S410 is performed.

After sample images are displayed in step S115, the time measurement unit 2022 measures a period of time when the sample images are displayed with respect to the sample images which are being displayed (step S405).

The measurement of the period of time when the sample images are displayed is performed for each sample image. Here, for example, the time measurement unit 2022 increases a count value of a counter indicating the period of time when the sample images are displayed by a predetermined value (count-up). While the sample images are being displayed on the display interface 201, the measured period of time increases whenever the process of step S405 is performed. After the period of time when the sample images are displayed is measured, in step S120, the display control unit 2020 determines whether or not there is a sample image of which the period of time measured in step S405 exceeds the display times stored in the storage module 200 with respect to the sample images which are being displayed.

In a case where it is determined that the image display terminal 20g is operated in the mode other than the image display mode, the display control unit 2020 and the time measurement unit 2022 retain information about the sample images which are being displayed (step S410). For example, the display control unit 2020 retains identification information about the sample images which are being displayed. The identification information about the sample images which are being displayed may be flags associated with the sample images. The identification information about the sample images which are being displayed may be stored in the storage module 200. Further, the time measurement unit 2022 stops the measurement once, and retains the measured period of time in association with the sample images. The measured period of time may be stored in the storage module 200.

After the information about the sample images which are being displayed is retained, the display control unit 2020 determines whether to terminate the operation (step S415). For example, in a case where there is an event for cutting off a power source according to a user's instruction or the like, it is determined that the operation is to be terminated, and the image display terminal 20g terminates the operation. Further, in a case where the operation is not to be terminated, the process of step S400 is performed.

In a case where the mode of the image display terminal 20g is switched to the mode other than the image display mode and then is switched to the image display mode again, in step S110, the display control unit 2020 refers to the information retained in step S410. The display control unit 2020 preferentially selects sample images indicated by the retained identification information. As a result, in step S115, the sample images displayed before the mode of the image display terminal 20g is switched to the mode other than the image display mode are displayed again.

In a case where the mode of the image display terminal 20g is switched to the mode other than the image display mode and then is switched to the image display mode again, in step S405, the time measurement unit 2022 refers to the information retained in step S410. The time measurement unit 2022 sets the retained period of time again to re-start the measurement of the period of time. As a result, a period of time when the image display terminal 20g is operated in the mode other than the image display mode is not reflected to the period of time when the sample images are displayed. Since the processes of steps S100 to S130 are already described, description thereof will not be repeated.

According to this embodiment, based on the period of time when the sample images are displayed while the image display terminal 20g is being operated in the image display mode, it is possible to cause the sample images to enter the non-display mode. Accordingly, it is possible continuously display the sample images in the image display mode even though the mode of the image display terminal 20g is switched to the mode other than the image display mode.

Sixth Embodiment

Figure 14:
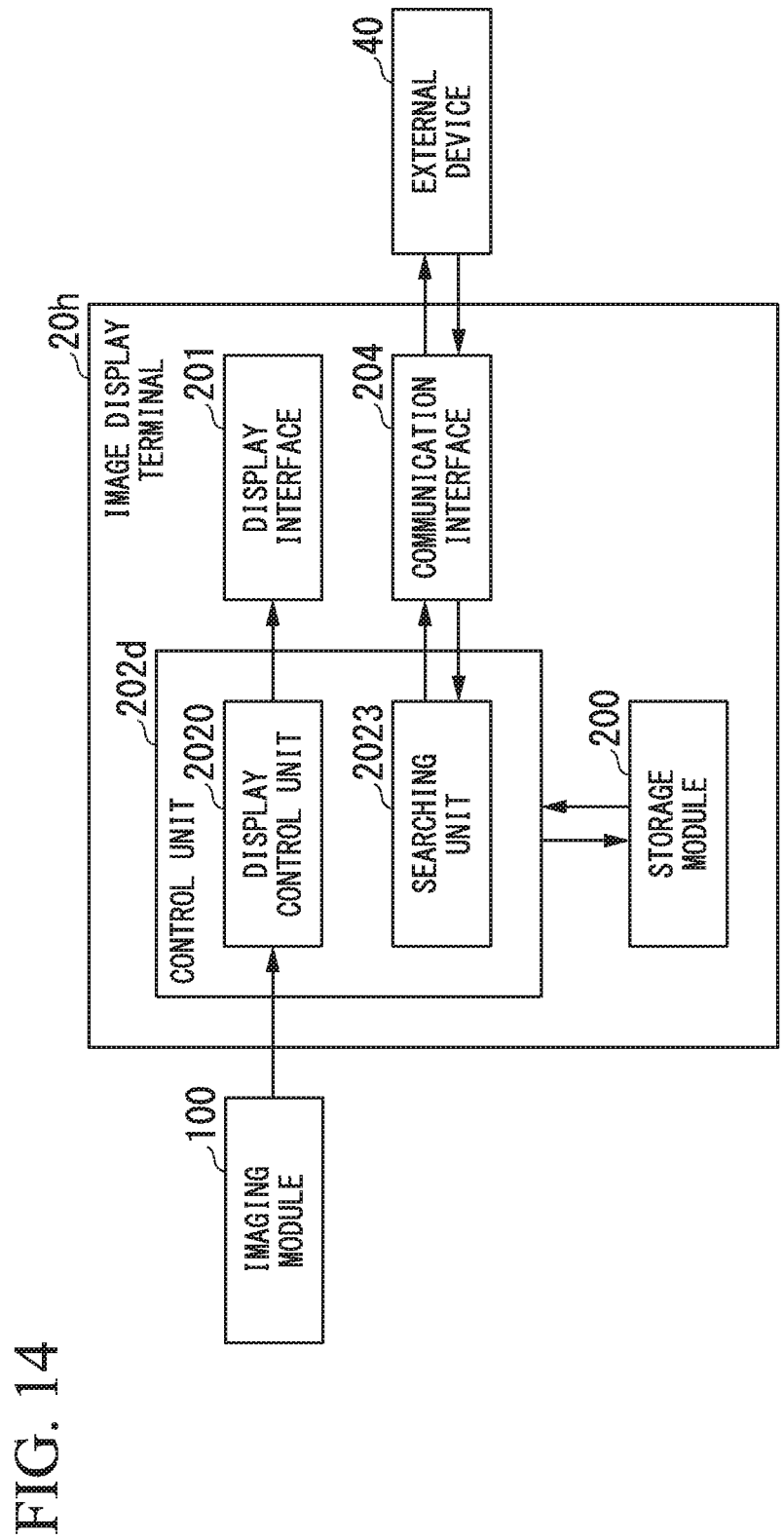
FIG. 14 is a block diagram illustrating a configuration of an image display terminal according to a sixth embodiment of the invention.

Next, a sixth embodiment of the invention will be described. FIG. 14 shows a configuration of an image display terminal 20h according to this embodiment. The image display terminal 20h includes the storage module 200, the display interface 201, a control unit 202d, and a communication interface 204. Description of the components already described above will not be repeated. The control unit 202d includes the display control unit 2020 and a searching unit 2023. The searching unit 2023 generates search query information indicating an image searching condition. The communication interface 204 (communication module or communication device) transmits the search query information to an external device 40 and receives images (search result images) searched based on the search query information from the external device 40 through communication with the external device 40. The communication performed by the communication interface 204 may be any one of wired communication or wireless communication. The storage module 200 stores the received images (search result images) as sample images. The external device 40 is a server, a storage device, or the like that retains the images which become the sample images.

The search query information is a search query based on a search keyword (imaging place, imaging target, or the like). The search query information may be image information generated from a sample image (for example, information about a feature value of the image).

Figure 15:
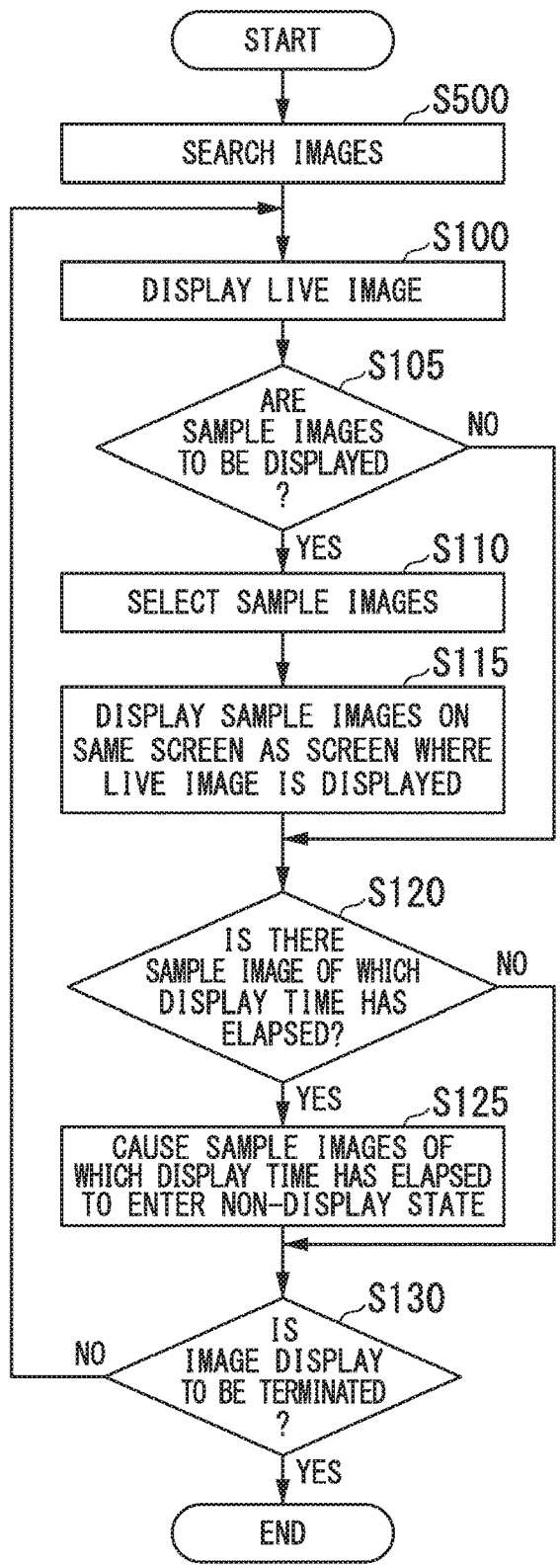
FIG. 15 is a flowchart illustrating a procedure of an operation of the image display terminal according to the sixth embodiment of the invention.

Next, an operation of the image display terminal 20h will be described. FIG. 15 shows an example of a procedure of the operation of the image display terminal 20h. Hereinafter, different points compared with the operation shown in FIG. 3 will be described.

If an operation of displaying a live image is started, the searching unit 2023 generates search query information and outputs the generated search query information to the communication interface 204, and the communication interface 204 transmits the search query information to the external device 40. The communication interface 204 receives search results from the external device 40, and outputs the search results to the searching unit 2023 (step S500). Thus, images are searched. As described in the other embodiments, a user may designate the image searching condition.

After the images are searched, in step S100, a live image is displayed. Since the processes of steps S100 to S130 are already described, description thereof will not be repeated.

The searching unit 2023 receives images (search result images) indicated by the search results from the external device 40 through the communication interface 204 at an arbitrary timing from the time when the images are searched (step S500) to the time when the sample images are displayed (step S115). The searching unit 2023 stores the images received by the communication interface 204 in the storage module 200 as sample images. The sample images may not be stored in the storage module 200 before the images are searched.

The reception of the images may be performed after the selection of the sample images (step S110). In this case, in step S110, the display control unit 2020 selects identification information about images to be displayed on the display interface 201 from identification information (file name or the like) about the images included in the search results. Then, images corresponding to the selected identification information are received from the external device 40.

In FIG. 15, the images are initially searched (step S500), but the timing when the images are searched (step S500) is not limited thereto. In a case where the sample images are not stored in the storage module 200 at a time point when the operation of displaying the live image is started, the search of the images (step S500) may be performed before the selection of the sample images (step S110). After the images received by the search are stored in the storage module 200, the search of the images (step S500) may be performed at an arbitrary timing. In a case where the sample images are stored in the storage module 200 at the time point when the operation of displaying the live image is started, the search of the images (step S500) may be performed at an arbitrary timing.

Modification Example

Next, a modification example of the sixth embodiment of the invention will be described. In this modification example, sample images to be displayed on the display interface 201 are changed according to search results of images.

In this modification example, based on a result obtained by comparing identification information about sample images which are being displayed with identification information about sample images stored in the storage module 200 by search, the display control unit 2020 selects any one of the sample images which are being displayed. Further, the display control unit 2020 performs a control so that the display interface 201 causes the selected sample image to enter a non-display state and displays the sample images stored in the storage module 200 by searching for display times. For example, in a case where any one piece of identification information about the sample images which are being displayed is the same as the identification information about the sample images stored in the storage module 200 by searching, a corresponding sample image enters a non-display state, and the other sample images are displayed. Thus, it is possible to update sample images to be displayed according to search results of images.

Further, in this modification example, the searching unit 2023 generates search query information whenever a predetermined time has elapsed. Further, the communication interface 204 transmits the search query information to the external device 40 whenever the predetermined time has elapsed. That is, search of images is performed at an interval of the predetermined time. Thus, it is possible to update sample images to be displayed according to the latest search results.

Figure 16:
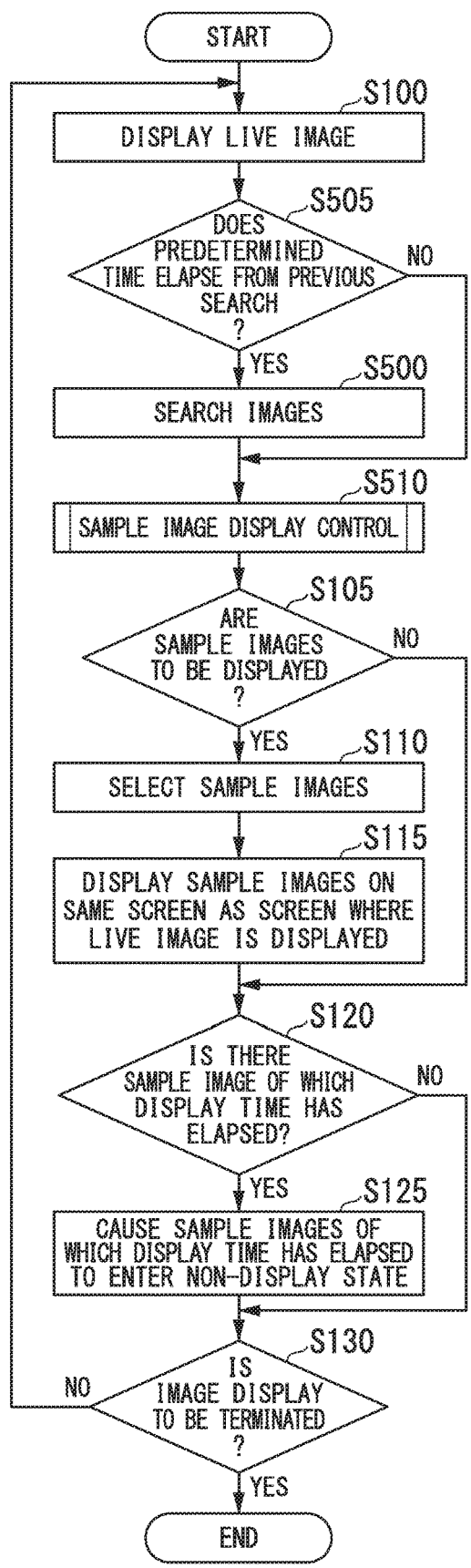
FIG. 16 is a flowchart illustrating a procedure of an operation of an image display terminal according to a modification example of the sixth embodiment of the invention.

Next, an operation of the image display terminal 20h according to this modification example will be described. FIG. 16 shows an example of a procedure of the operation of the image display terminal 20h. Hereinafter, different points compared with the operation shown in FIG. 3 will be described.

After the live image is displayed in step S100, the searching unit 2023 determines whether or not a predetermined time has elapsed after the previous search is performed (step S505). In a case where it is determined that the predetermined time has not elapsed after the previous search is performed, a process of step S510 is performed.

In a case where it is determined that the predetermined time has elapsed after the previous search is performed, the search of the images is performed in step S500. After the search of the images is performed, the display control unit 2020 performs a display control of the sample images based on the search results (step S510).

After the display control of the sample images is performed, the process of step S105 is performed. Since the processes of steps S100 to S130 is already described, description thereof will not be repeated.

Figure 17:
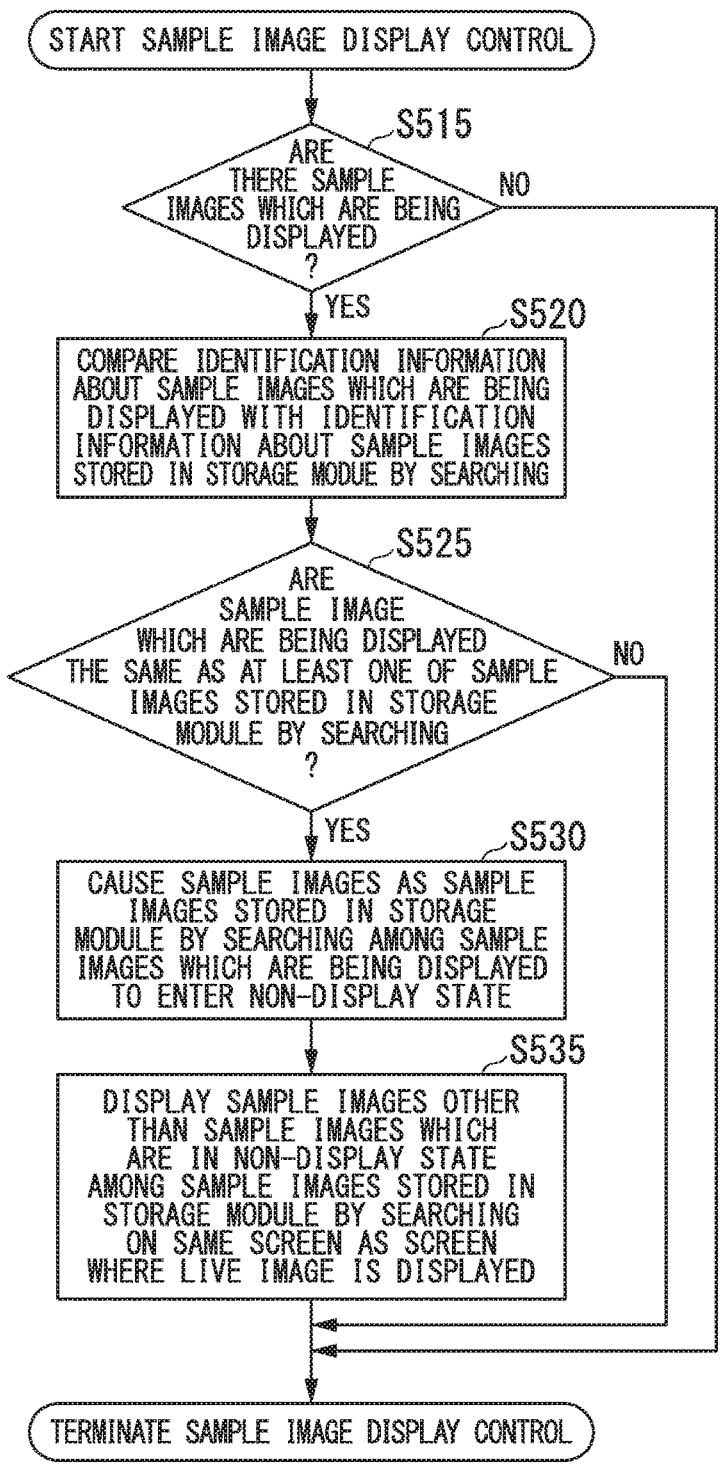
FIG. 17 is a flowchart illustrating a procedure of an operation of the image display terminal according to the modification example of the sixth embodiment of the invention.

FIG. 17 shows an example of a procedure of the operation of the image display terminal 20h in the display control (step S510) of the sample images. The display control unit 2020 determines whether or not there is a sample image which is being displayed (step S515). Here, for example, the display control unit 2020 performs determination based on a flag indicating whether or not the sample images are being displayed. The flag is stored in the storage module 200 to pair with the sample images, that is, in a state of being associated with the sample images. For example, a value of the flag is different between a case where the sample images are being displayed and a case where the sample images are not being displayed. In a case where it is determined that there is no sample image which is being displayed, the process of step S510 is performed.

In a case where it is determined that there are the sample images which are being displayed, the display control unit 2020 compares identification information about the sample images which are being displayed with identification information about the sample images stored in the storage module 200 by searching (step S520). The identification information (additional information) about the sample images is a file name, for example. The identification information about the sample images may be a combination of a file name and a generation time point or an updating time point of a file. Further, the identification information about the sample images may be the size (file size) of image data of the sample images.

After the comparison of the identification information about the sample images is performed, the display control unit 2020 determines whether or not the sample images which are being displayed are the same as at least one of the sample images stored in the storage module 200 by searching, based on the comparison result in step S520 (step S525). In a case where it is determined that the sample images which are being displayed is not the same as at least one of the sample image stored in the storage module 200 by searching, the process of step S510 is performed.

In a case where it is determined that the sample images which are being displayed are the same as at least one of the sample images stored in the storage module 200 by searching, the display control unit 2020 performs a control so that the display interface 201 causes the identical sample images as the sample images stored in the storage module 200 by searching, among the sample images which are being displayed to enter a non-display state (step S530). As a result, the display interface 201 causes the identical sample image as the sample images stored in the storage module 200 by searching to enter the non-display state. That is, the display interface 201 deletes the identical sample images as the sample images stored in the storage module 200 by searching from the screen of the display interface 201.

After the sample images enter the non-display state, the display control unit 2020 displays sample images other than the sample images which are in the non-display state among the sample images stored in the storage module 200 by searching on the same screen as the screen where a live image is displayed (step S535). For example, in a case where sample images A and B are displayed on the display interface 201 and sample images B and C are images received by searching, the sample image B enters the non-display state, and the sample image C enter the display state. After the sample image is displayed, the process of step S510 is performed.

According to this embodiment, it is possible to display sample images acquired from a network. Accordingly, it is possible to acquire and display a large number of sample images.

Seventh Embodiment

Figure 18:
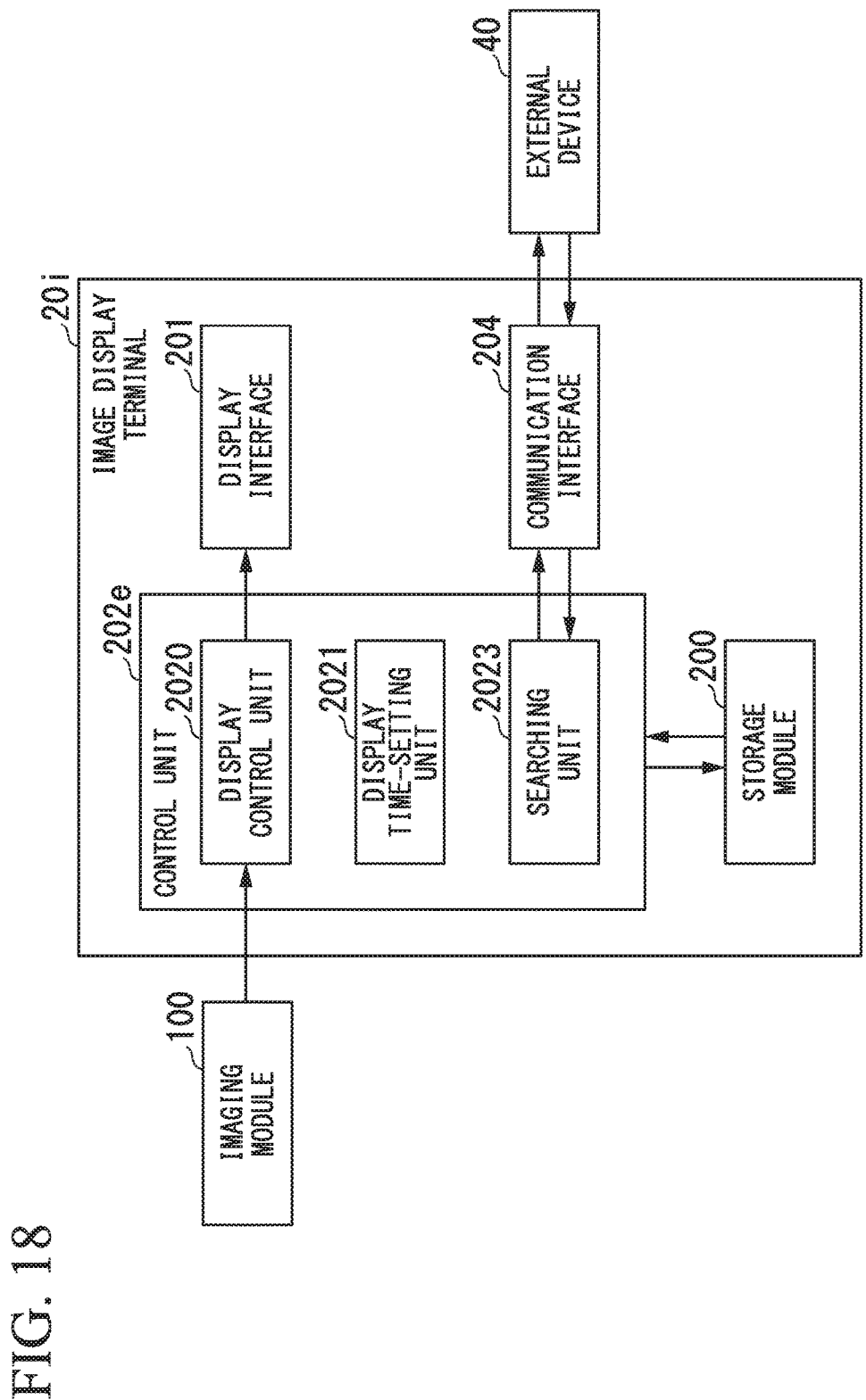
FIG. 18 is a block diagram illustrating a configuration of an image display terminal according to a seventh embodiment of the invention.

Next, a seventh embodiment of the invention will be described. FIG. 18 shows a configuration of an image display terminal 20i according to this embodiment. The image display terminal 20i includes the storage module 200, the display interface 201, a control unit 202e, and the communication interface 204. Description of the components already described above will not be repeated. The control unit 202e includes the display control unit 2020, the display time-setting unit 2021, and the searching unit 2023.

In this embodiment, display times of sample images are set according to search results of images. For example, the display time-setting unit 2021 determines the display times based on the number of searched images (search result images) and stores the determined display times in the storage module 200. Thus, it is possible to set the display times of the sample images according to the number of searched images.

Further, the display time-setting unit 2021 determines the display time for each of the sample images to be shorter as the number of searched images (search result images) becomes larger.

Further, the display time-setting unit 2021 determines the display times of the sample images to be zero in a case where the number of searched images (search result images) is smaller than a predetermined number. As a result, sample images of which the display times are zero are not displayed, or although displayed, the sample images enter a non-display state immediately after the display. Thus, it is possible to prevent sample images for which the number of searched images is small and thus reliability is considered to be low from being viewed to a user.

Further, in this embodiment, the number of sample images which are simultaneously displayed is controlled according to search results of images. For example, the display control unit 2020 performs a control for simultaneously displaying a larger number of sample images as the number of searched images (search result images) becomes larger. Thus, it is possible to show a large number of sample images for which the number of searched images is large and thus reliability is considered to be high to the user.

Figure 19:
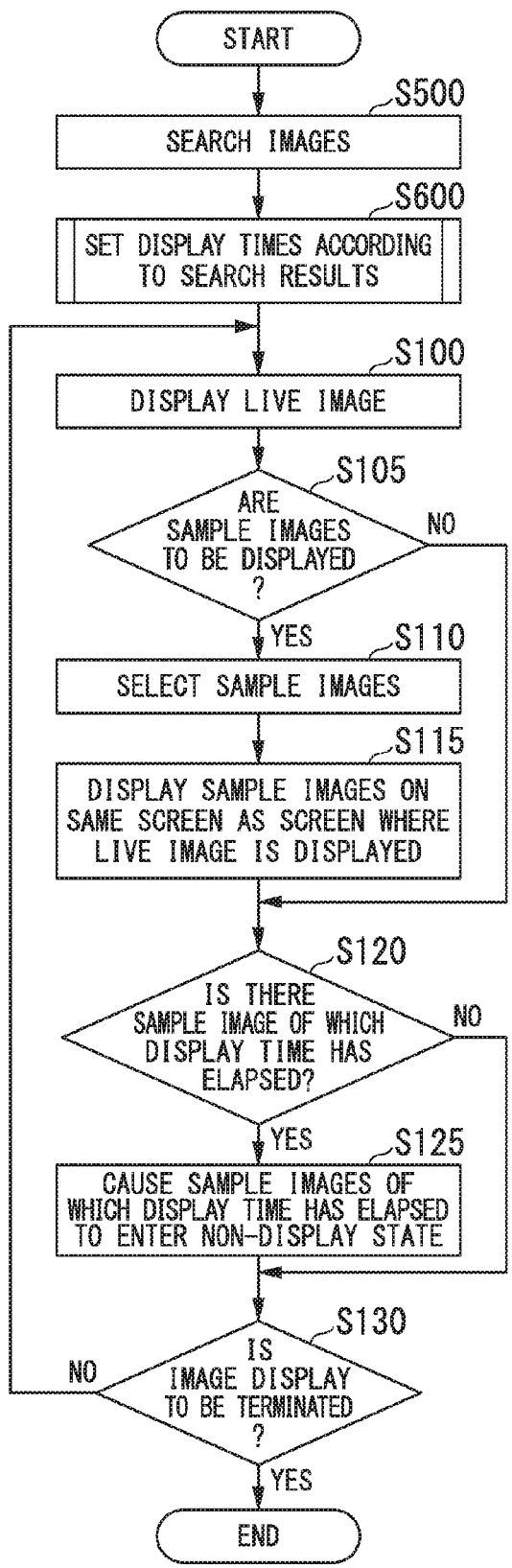
FIG. 19 is a flowchart illustrating a procedure of an operation of the image display terminal according to the seventh embodiment of the invention.

Next, an operation of the image display terminal 20i will be described. FIG. 19 shows an example of a procedure of the operation of the image display terminal 20i. Hereinafter, different points compared with the operation shown in FIG. 15 will be described.

After the images are searched in step S500, the display control unit 2020 and the display time-setting unit 2021 set display times according to the search results (step S600). After the display times are set, a live image is displayed in step S100. Since the processes of steps S100 to S130 are already described, description thereof will not be repeated.

Figure 20:
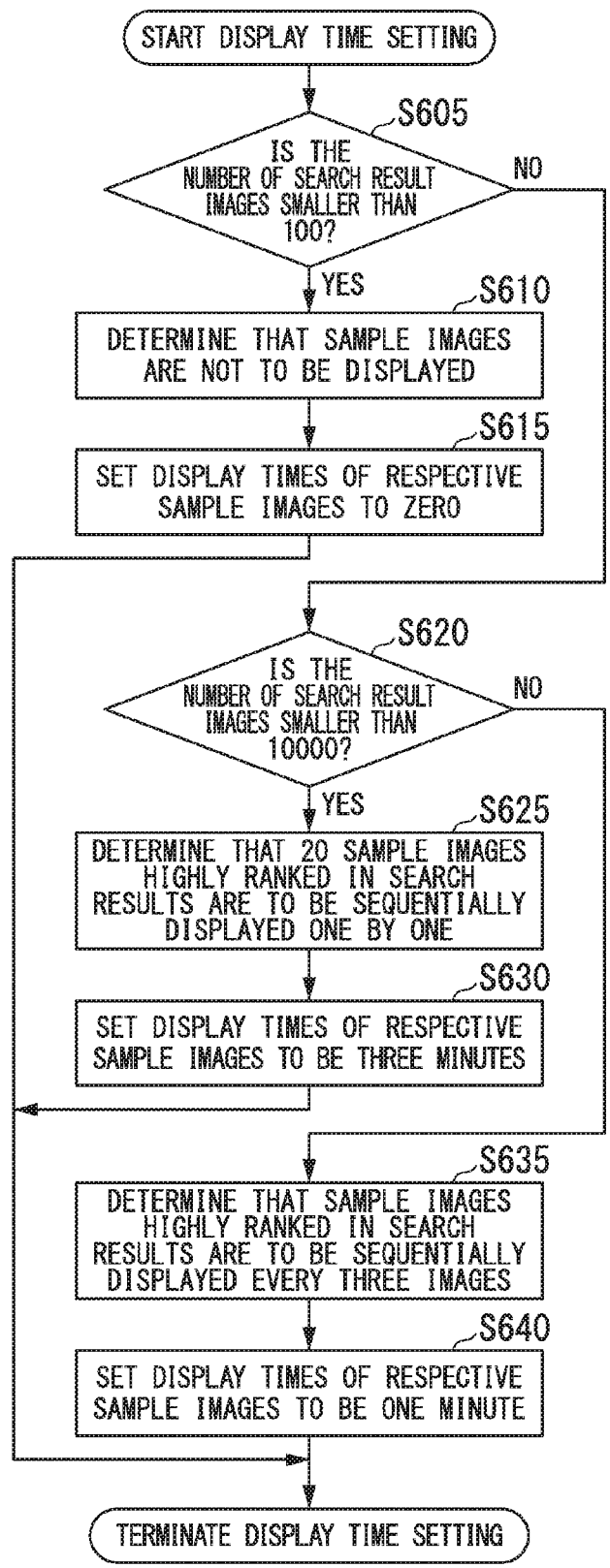
FIG. 20 is a flowchart illustrating a procedure of an operation of the image display terminal according to the seventh embodiment of the invention.

FIG. 20 shows an example of a procedure of the operation of the image display terminal 20i in setting of display times (step S600). The display control unit 2020 determines whether or not the number of searched images is smaller than 100 (step S605). In a case where it is determined that the number of searched images is smaller than 100, the display control unit 2020 determines that the sample images are not to be displayed (step S610). Subsequently, the display time-setting unit 2021 determines display times of the respective sample images to be zero, and stores the determined display times in the storage module 200 (step S615).

Thus, the display times of the sample images are set to zero.

Then, a live image is displayed in step S100. In a case where the display times are set in step S615, sample images are selected in step S110 and the sample images are displayed in step S115, but immediately thereafter, the sample images enter a non-display state in step S120.

Alternatively, in a case where the display times of the sample images are set to zero, it may be determined that the sample images are not to be displayed in step S105.

In a case where it is determined that the number of searched images is equal to or greater than 100, the display control unit 2020 determines whether or not the number of searched images is smaller than 10000 (step S620). In a case where it is determined that the number of searched images is smaller than 10000, the display control unit 2020 determines that 20 sample images highly ranked in the search results are to be sequentially displayed one by one (step S625). Ranking of the images in the search results is based on a display rate (click rate) of the images or a selection rate (induction rate) of the search results. Subsequently, the display time-setting unit 2021 determines display times of the respective sample images to be three minutes, and stores the determined display times in the storage module 200 (step S630). Thus, the display times of the sample images are set to three minutes.

Then, a live image is displayed in step S100. In a case where the display times are set in step S630, one sample image is selected in step S110, and the one sample image is displayed in step S115. If three minutes elapse after the sample image is displayed, the sample image enters a non-display state in step S120. Subsequently, the next one sample image is selected in step S110, and the one sample image is displayed in step S115. These processes are repeated, so that 20 sample images are sequentially displayed.

In a case where it is determined that the number of searched images is equal to or greater than 10000, the display control unit 2020 determines that 100 sample images highly ranked in the search results are to be sequentially displayed every three images (step S635). Subsequently, the display time-setting unit 2021 determines display times of the respective sample images to be one minute, and stores the determined display times in the storage module 200 (step S640). Thus, the display times of the sample images are set to one minute.

Subsequently, a live image is displayed in step S100. In a case where the display times are set in step S640, three sample images are selected in step S110, and the three sample images are displayed in step S115. If one minute elapses after the three sample images are displayed, the three sample images enter a non-display state in step S120. Then, the next three sample images are selected in step S110, and the three sample images are displayed in step S115. These processes are repeated, so that 100 sample images are sequentially displayed. Finally, only one sample image may be displayed, or four sample images may be displayed.

In the above-described processes, in a case where the number of searched images is equal to or greater than 100 and smaller than 10000, a display time corresponding to one of the sample images is three minutes, and in a case where the number of searched images is equal to or greater than 10000, a display time corresponding to one of the sample images is one minute. That is, the display time for each of the sample images is determined to be shorter as the number of searched images becomes larger.

100 and 10000 as threshold values in the above processes are only examples, and other values may be used as the threshold values. Further, one minute and three minutes as display times are examples, and other times may be used as the display times.

According to this embodiment, it is possible to set display times of sample images according to the number of searched images.

Eighth Embodiment

Figure 21:
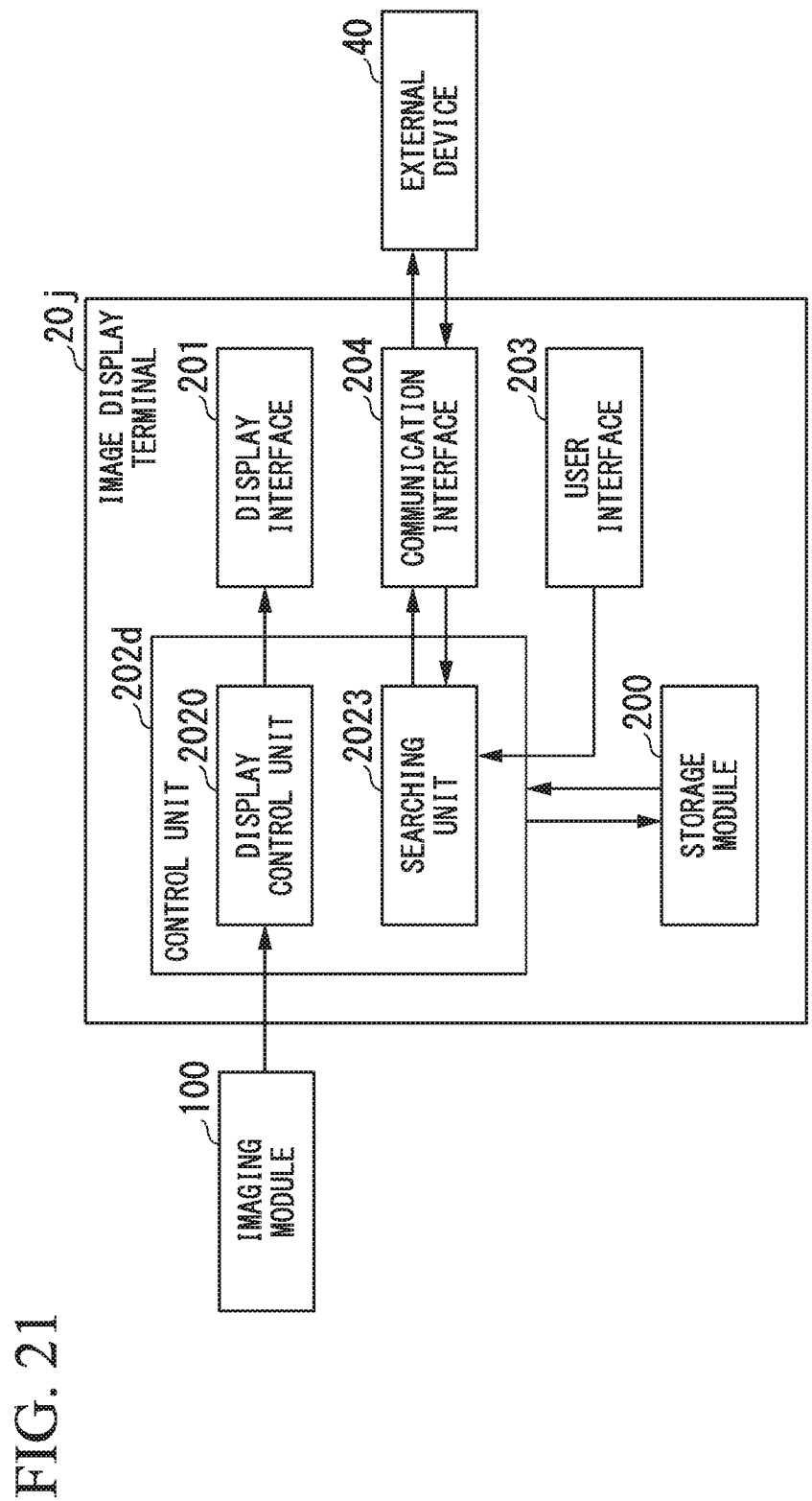
FIG. 21 is a block diagram illustrating a configuration of an image display terminal according to an eighth embodiment of the invention.

Next, an eighth embodiment of the invention will be described. FIG. 21 shows a configuration of an image display terminal 20*j* according to this embodiment. The image display terminal 20*j* includes the storage module 200, the display interface 201, the control unit 202*d*, the user interface 203, and the communication interface 204. Description of the components already described above will not be repeated.

In this embodiment, the searching unit 2023 generates, in a case where a user's operation received through the user interface 203 is an operation of designating an image searching condition, search query information based on the designated image searching condition. Thus, the user can designate the image searching condition. The image searching condition is a search keyword (imaging place, imaging target, or the like), for example. In a case where the user's operation received through the user interface 203 is an operation of designating a search keyword, the searching unit 2023 generates a search query based on the designated search keyword. The image searching condition may be a sample image stored in the storage module 200. In a case where the user's operation received through the user interface 203 is an operation of designating a sample image stored in the storage module 200, the searching unit 2023 generates image information for search based on the designated sample image (for example, information about a feature value of the image).

Figure 22:
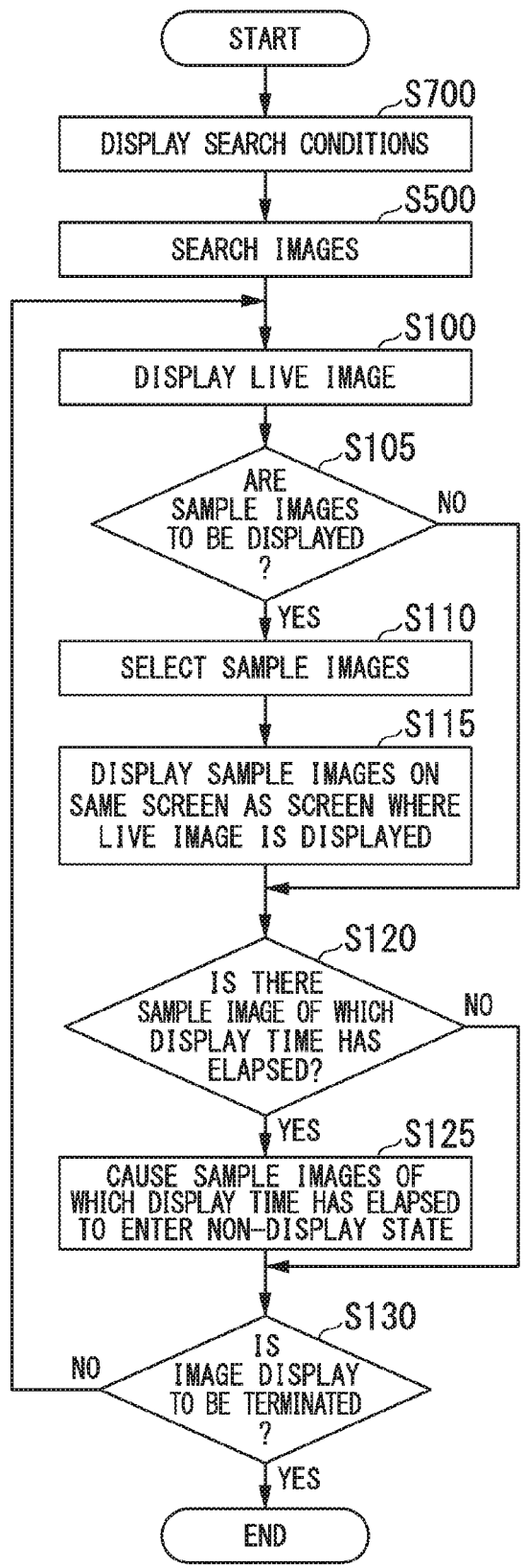
FIG. 22 is a flowchart illustrating a procedure of an operation of the image display terminal according to the eighth embodiment of the invention.

Next, an operation of the image display terminal 20*j* will be described. FIG. 22 shows an example of a procedure of the operation of the image display terminal 20*j*. Hereinafter, different points compared with the operation shown in FIG. 15 will be described.

If an operation of displaying a live image is started, the user interface 203 receives an operation of designating an image searching condition (step S700). Here, a screen where the image searching condition is designated may be displayed on the display interface 201. For example, the display control unit 2020 performs a control so that the display interface 201 displays the screen where the image searching condition is designated and the live image. The screen where the image searching condition is designated may be an input section for inputting the image searching condition (keyword, or the like). The input section may be displayed in a region different from a region where the live image is displayed on the screen of the display interface 201, or may be displayed over the live image in an overlapping manner.

After the image searching condition is designated by the user, the search of the images is performed in step S500.

Here, the searching unit 2023 generates search query information based on the image searching condition designated by the user. Since the processes of step S100 to S130 are already described, description thereof will not be repeated.

Next, a modification example of the eighth embodiment of the invention will be described.

First Modification Example

A first modification example will be described. In this modification example, in a case where a user's operation received through the user interface 203 is an operation of selecting sample images which are being displayed, the searching unit 2023 generates search query information for retrieving images similar to the selected sample images. For example, in a case where the user's operation received through the user interface 203 is the operation of selecting the sample images which are being displayed, the searching unit 2023 generates image information for searching from the selected sample images. Thus, it is possible to show a large number of sample images, similar to the sample images which are being displayed, to the user.

Second Modification Example

Next, a second modification example will be described. In this modification example, in a case where a user's operation received through the user interface 203 is an operation of selecting sample images which are being displayed, the searching unit 2023 stores search query information indicating an image searching condition that the selected sample images are searched in the storage module 200 in association with the selected sample images. In this modification example, in a case where the user's operation is an operation of designating an image searching condition, the searching unit 2023 retrieves sample images corresponding to the search query information indicating the designated image searching condition from the sample images stored in the storage module 200.

For example, when generated search query information is retained and an operation of selecting sample images which are being displayed is performed, the searching unit 2023 stores the retained search query information in the storage module 200 in association with the selected sample images. Further, in a case where the operation of designating an image searching condition is performed, the searching unit 2023 generates search query information indicating the designated image searching condition. The searching unit 2023 retrieves sample images associated with search query information that matches the generated search query information from the sample images stored in the storage module 200. As a result, instead of performing search of images on a network again, search of the sample images stored in the storage module 200 is performed. Thus, it is possible to reduce time and communication cost necessary for searching.

According to this embodiment, it is possible to retrieve sample images based on an image searching condition designated by a user.

Ninth Embodiment

Figure 23:
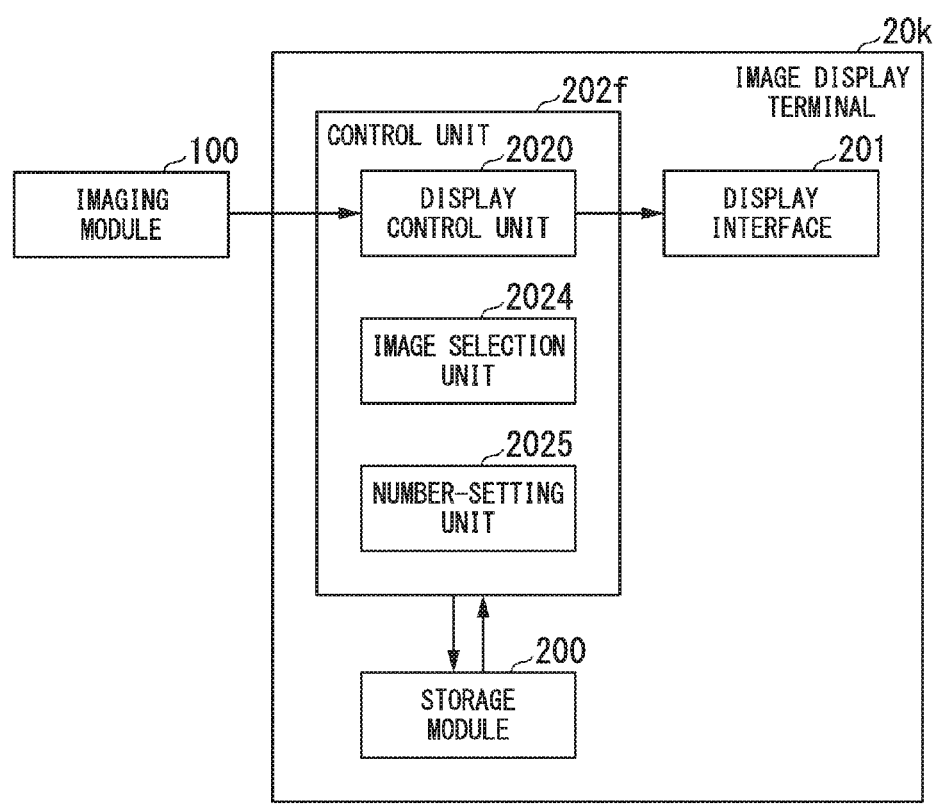
FIG. 23 is a block diagram illustrating a configuration of an image display terminal according to a ninth embodiment of the invention.

Next, a ninth embodiment of the invention will be described. FIG. 23 shows a configuration of an image display terminal 20k according to this embodiment. The image display terminal 20k includes the storage module 200, the display interface 201, and a control unit 202f. Description of the components already described above will not be repeated. The control unit 202f includes the display control unit 2020, an image selection unit 2024, and a number-setting unit 2025. The image selection unit 2024 selects sample images to display from sample images stored in the storage module 200. The display control unit 2020 performs a control so that the display interface 201 displays the selected sample images. The number-setting unit 2025 determines the number of sample images which are simultaneously displayed, and stores the determined number in the storage module 200.

The display control unit 2020 performs a control so that the display interface 201 displays the sample images corresponding to the determined number.

Further, in this embodiment, in a case where plural identical sample images are stored in the storage module 200, the image selection unit 2024 selects one sample image from the plural identical sample images. Here, it is preferable to perform a control so that the image selection unit 2024 selects one sample image from the plural identical sample images and does not select sample images other than the selected sample image. If the plural identical sample images are displayed in a wide area, an opportunity to show other sample images to a user is reduced. Accordingly, by performing a control so that the identical sample images are not displayed repetitively, it is possible to increase the opportunity to show various sample images to the user.

Further, in this embodiment, in a case where plural similar sample images are stored in the storage module 200, the image selection unit 2024 selects one sample image from the plural similar sample images. Here, it is preferable to perform a control so that the image selection unit 2024 selects one sample image from the plural similar sample images and does not select sample images other than the selected sample image. If the plural similar sample images are displayed in a wide area, an opportunity to show other sample images to a user is reduced. Accordingly, by performing a control so that the similar sample images are not displayed repetitively, it is possible to increase the opportunity to show various sample images to the user.

Figure 24:
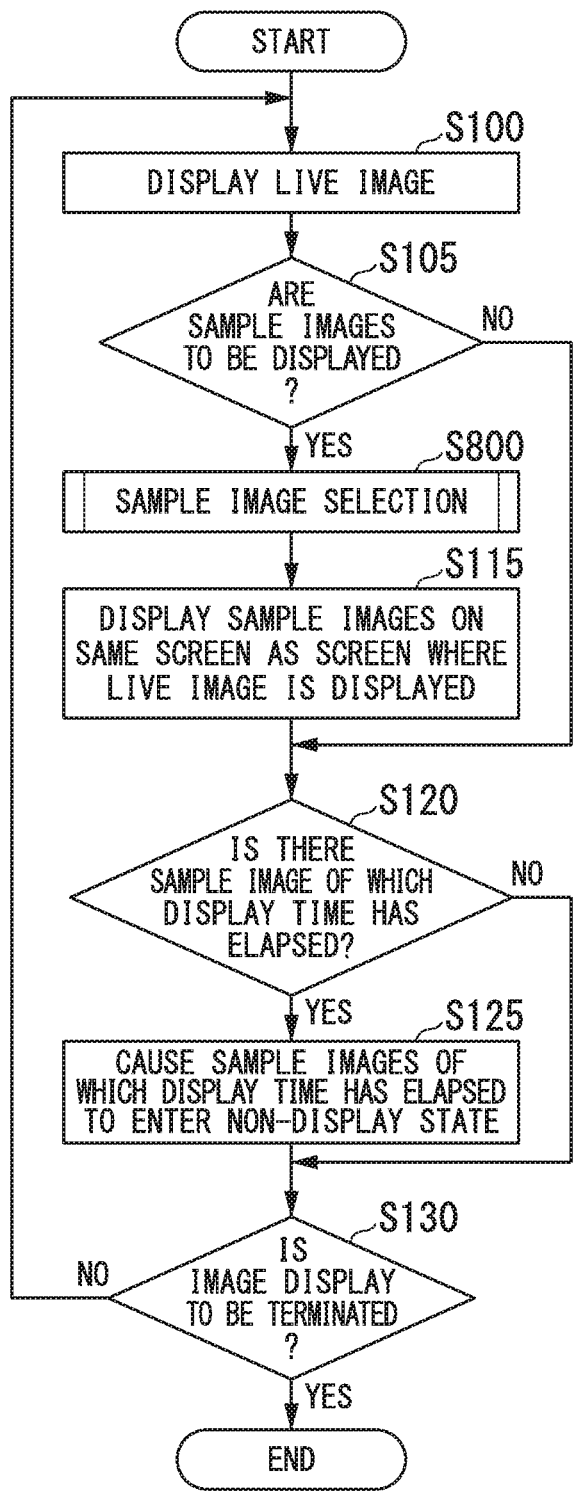
FIG. 24 is a flowchart illustrating a procedure of an operation of the image display terminal according to the ninth embodiment of the invention.

Next, an operation of the image display terminal 20k will be described. FIG. 24 shows an example of a procedure of the operation of the image display terminal 20k. Hereinafter, different points compared with the operation shown in FIG. 3 will be described.

In a case where it is determined that sample images are to be displayed in step S105, the image selection unit 2024 selects sample images to be displayed on the display interface 201 from the sample images stored in the storage module 200 (step S800). After the sample images are selected, the sample images are displayed in step S115. Since the processes of step S100 to S105 and steps S115 to S130 are already described, description thereof will not be repeated.

Figure 25:
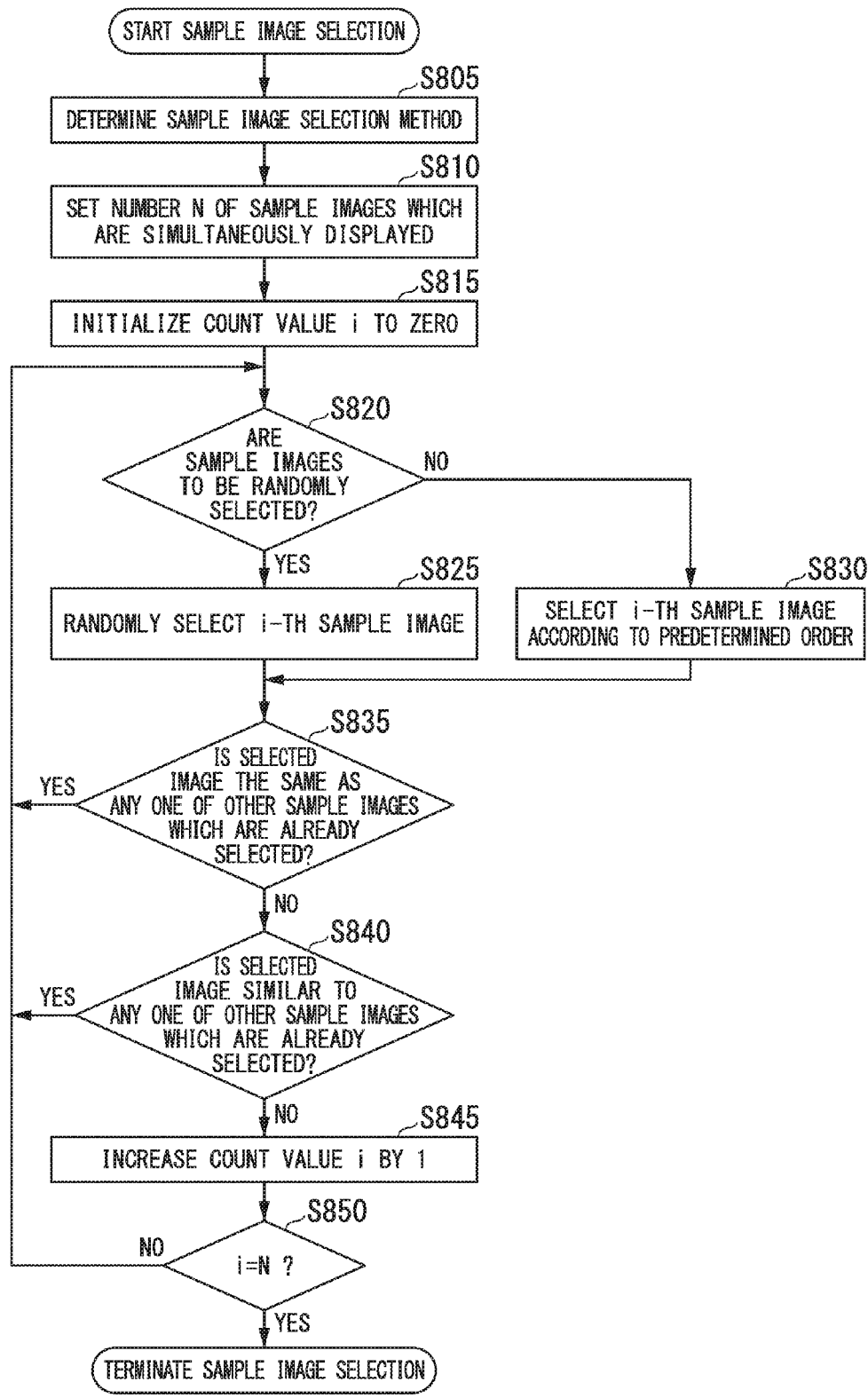
FIG. 25 is a flowchart illustrating a procedure of an operation of the image display terminal according to the ninth embodiment of the invention.

FIG. 25 shows an example of a procedure of an operation of the image display terminal 20k in the selection of the sample images (step S800). The image selection unit 2024 determines a sample image selection method (step S805). In the example of this embodiment, the sample image selection method includes a method for randomly selecting sample images from the sample images stored in the storage module 200 and a method for selecting sample images according to a predetermined order from the sample images stored in the storage module 200. In the method for selecting the sample images according to the predetermined order, for example, sample images are selected in an order such that a sample image of which a file is created most recently is preferentially selected. In a case where the image display terminal 20k includes the searching unit 2023 and the communication interface 204, in the method for selecting the sample images according to the predetermined order, the sample images may be selected according to an order indicated by search results.

The image selection unit 2024 may select a method regulated by a program, and may determine the selected method as the sample image selection method. Further, the image selection unit 2024 may determine that a method used when a sample image is selected the last time is to be used.

In a case where the image display terminal 20k includes the user interface 203, the user may select the sample image selection method. In a case where the user selects the sample image selection method, the image selection unit 2024 determines the sample image selection method based on a method selected by the user.

For example, in a case where the user selects the method for randomly selecting the sample images, the image selection unit 2024 determines that the sample images are to be randomly selected. Further, in a case where the user selects the method for selecting the sample images according to the predetermined order, the image selection unit 2024 determines that the sample images are to be selected according to the predetermined order.

After the method for selecting the sample images is determined, the number-setting unit 2025 determines the number N of sample images which are simultaneously displayed, and stores the determined number N in the storage module 200 (step S810). Accordingly, the number N of sample images which are simultaneously displayed is set. The number-setting unit 2025 selects a number regulated by a program, and may determine the selected number as the number N of sample images. Further, in a case where the image display terminal 20k includes the user interface 203, the user may select the number of sample images. In a case where the user selects the number of sample images, the number-setting unit 2025 determines the number N of sample images based on the number selected by the user.

After the number N of sample images which are simultaneously displayed is set, the image selection unit 2024 initializes a count value i to zero (step S815). After the count value i is initialized to zero, the image selection unit 2024 determines whether or not sample images are to be randomly selected based on the sample image selection method determined in step S805 (step S820).

In a case where it is determined that sample images are to be randomly selected, the image selection unit 2024 randomly selects an i-th sample image from the sample images stored in the storage module 200 (step S825). Further, in a case where it is determined that the sample images are not to be randomly selected, the image selection unit 2024 selects the i-th sample image according to a predetermined order from the sample images stored in the storage module 200 (step S830).

After the sample image is selected, the image selection unit 2024 determines whether or not the sample image selected as the i-th sample image is the same as any one of other sample images selected as a 0-th sample image to an (i−1)-th sample image (step S835). The determination in step S835 is performed based on a result obtained by comparing plural sample images. The comparison of the sample images may be comparison (pattern matching) of pixel data of the sample images, or may be comparison of identification information (additional information) of the sample images. The identification information of the sample images may be a file name or a combination of a file name and a generation time point or an updating time point of a file. Further, the identification information of the sample images may be the size (file size) of image data of the sample images. In a case where i=1, it is determined that the first sample image is not the same as the other sample images.

In a case where it is determined that the sample image selected as the i-th sample image is the same as any one of the other sample images selected as the 0-th sample image to the (i−1)-th sample image, the process of step S820 is performed. Further, in a case where it is determined that the sample image selected as the i-th sample image is not the same as any one of the other sample images selected as the 0-th sample image to the (i−1)-th sample image, the image selection unit 2024 determines whether or not the sample image selected as the i-th sample image is similar to any one of the other sample images selected as the 0-th sample image to the (i−1)-th sample image (step S840). The determination in step S840 is performed based on a result obtained by comparing plural sample images. The comparison of the sample images may be comparison (pattern matching) of pixel data of the sample images. When i=1, it is determined that the first sample image is not the same as the other sample images.

In a case where it is determined that the sample image selected as the i-th sample image is similar to any one of the other sample images selected as the 0-th sample image to the (i−1)-th sample image, the process of step S820 is performed. Further, in a case where it is determined that the sample image selected as the i-th sample image is not similar to any one of the other sample images selected as the 0-th sample image to the (i−1)-th sample image, the image selection unit 2024 increases the count value i by 1 (step S845).

After the count value i is increased, the image selection unit 2024 determines whether or not the count value i and the number N of sample images determined in step S810 are the same (step S850). In a case where it is determined that the count value i and the number N of sample images are not the same, the process of step S820 is performed. Further, in a case where it is determined that the count value i and the number N of sample images are the same, the process of step S115 is performed. As a result of the processes, N sample images are selected, so that the N sample images are displayed in step S115.

After the i-th sample image is selected in step S825 or step S830, in a case where the sample images are the same in step S835, or in a case where it is determined that the sample images are similar to each other in step S840, the i-th sample image is selected again in step S825 or step S830. Accordingly, the sample image which is the same as or similar to the already selected sample image is not selected. That is, only one sample image is selected from among the plural identical sample images. Further, only one sample image is selected from among the plural similar sample images.

Next, a modification example of the ninth embodiment of the invention will be described. In this modification example, only sample images capable of being captured in a current system are selected.

Modification Example

In this modification example, the storage module 200 stores imaging conditions information (imaging parameters) indicating imaging conditions when sample images are captured in association with the sample images. Further, the image selection unit 2024 selects only sample images corresponding to imaging conditions information indicating imaging conditions which can apply to the imaging module 100 from among the imaging conditions information stored in the storage module 200. Thus, it is possible to display only sample images capable of being captured in a current system.

Figure 26:
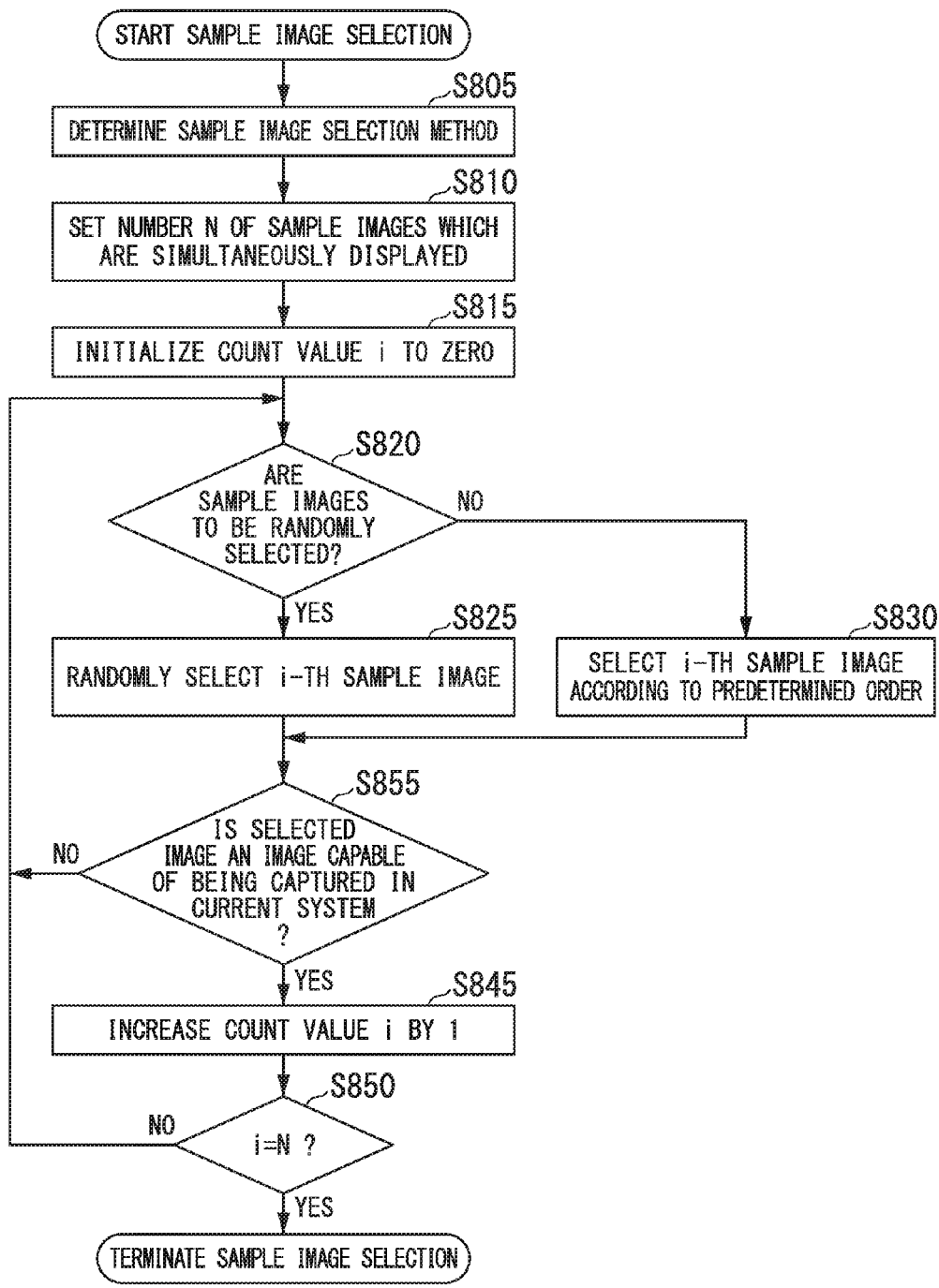
FIG. 26 is a flowchart illustrating a procedure of an operation of an image display terminal according to a modification example of the ninth embodiment of the invention.

FIG. 26 shows an example of a procedure of the operation of the image display terminal 20k in the selection (step S800) of sample images in this modification example. Since the processes of steps S805 to S830 are already described, description thereof will not be repeated.

After the sample images are selected in step S825 or step S830, the image selection unit 2024 determines whether or not the selected sample images are images capable of being captured in a current system (step S855). As described above, the storage module 200 stores imaging conditions information in association with sample images. The imaging conditions information may be an Exif, for example, and includes a focal distance, a shutter speed, sensitivity information, and information about the presence or absence of a flash or the like. The image selection unit 2024 acquires the imaging conditions information from the imaging module 100, and sequentially reads imaging conditions information of each sample image from the storage module 200. The image selection unit 2024 sequentially compares the imaging conditions information acquired from the imaging module 100 with the imaging conditions information read from the storage module 200.

In a case where any one piece of the imaging conditions information read from the storage module 200 is the same as the imaging conditions information acquired from the imaging module 100 (or close thereto), it is determined that the selected sample image is the image capable of being captured in the current system. For example, in a case where a shutter speed read from the storage module 200 is within a predetermined threshold value range with reference to a shutter speed acquired from the imaging module 100, it is determined that the imaging conditions information read from the storage module 200 and the imaging conditions information acquired from the imaging module 100 are close to each other. Further, in a case where all of the imaging conditions information read from the storage module 200 is different (or quite different) from the imaging conditions information acquired from the imaging module 100, it is determined that the selected sample image is not the image capable of being captured in the current system.

In a case where it is determined that the selected sample image is not the image capable of being captured in the current system, the process of step S820 is performed. Further, in a case where it is determined that the selected sample image is the image capable of being captured in the current system, the count value i increases in step S845. Since the processes of steps S845 to S850 are already described, description thereof will not be repeated.

According to this embodiment, it is possible to select and display some sample images from a large number of sample images stored in the storage module 200. Further, it is possible to control the number of sample images which are simultaneously displayed.

Tenth Embodiment

Figure 27:
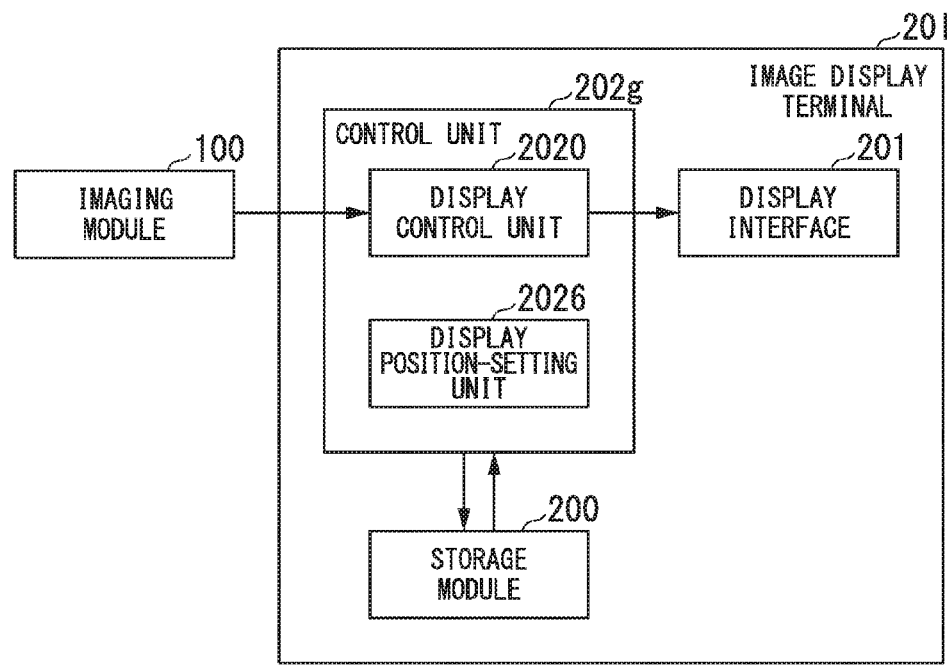
FIG. 27 is a block diagram illustrating a configuration of an image display terminal according to a tenth embodiment of the invention.

Next, a tenth embodiment of the invention will be described. FIG. 27 shows a configuration of an image display terminal 20*l* according to this embodiment. The image display terminal 20*l* includes the storage module 200, the display interface 201, and a control unit 202*g*. Description of the components already described above will not be repeated. The control unit 202*g* includes the display control unit 2020, and a display position-setting unit 2026. The display position-setting unit 2026 determines display positions of sample images, and stores the determined display positions in the storage module 200. The display control unit 2020 performs a control so that the display interface 201 displays the sample images at the determined display positions.

Figure 28:
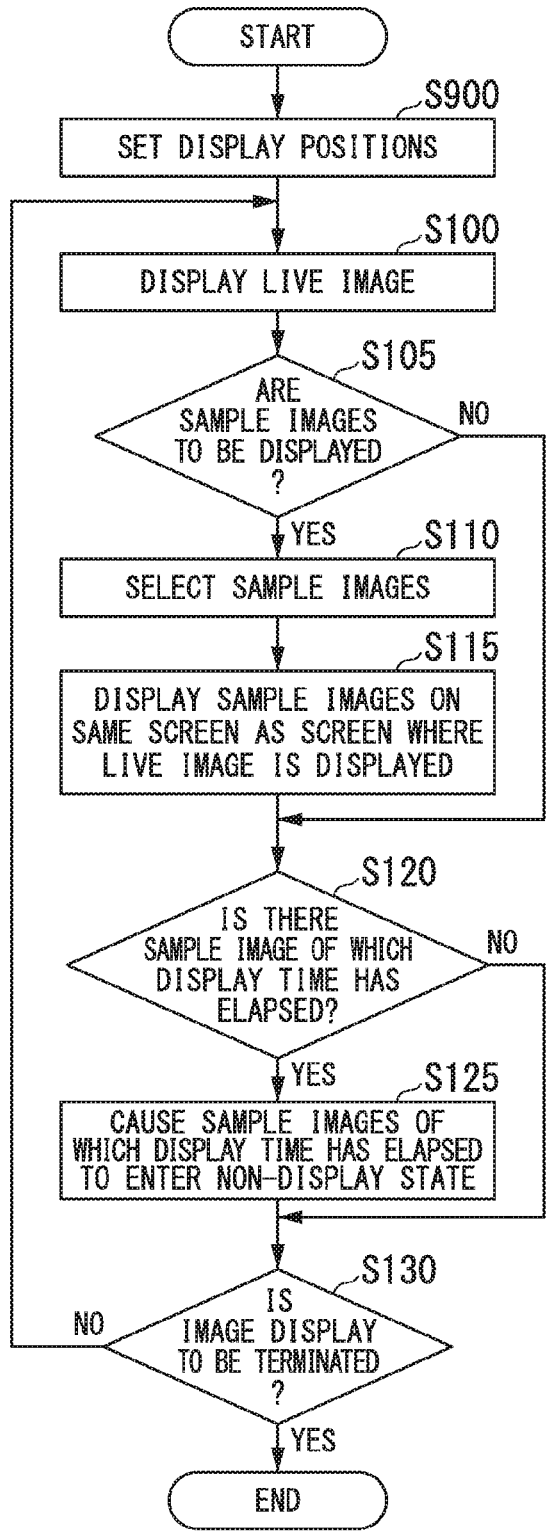
FIG. 28 is a flowchart illustrating a procedure of an operation of the image display terminal according to the tenth embodiment of the invention.

Next, an operation of the image display terminal 20*l* will be described. FIG. 28 shows an example of a procedure of the operation of the image display terminal 20*l*. Hereinafter, different points compared with the operation shown in FIG. 3 will be described.

If an operation of displaying a live image is started, the display position-setting unit 2026 determines display positions of sample images, and stores the determined display positions in the storage module 200 (step S900). Thus, the display positions of the sample images on the screen where the live image is displayed are set. In step S115, the sample images are displayed at the display positions determined in step S900.

The display position-setting unit 2026 may select display positions of sample images regulated in a program, and may determine the selected display positions as the display positions of the sample images. Further, in a case where the image display terminal 20*l* includes the user interface 203, a user may select display positions of sample images. In a case where the user selects the display positions of the sample images, the display position-setting unit 2026 determines the display positions of the sample images based on the display positions selected by the user.

The display position-setting unit 2026 may determine positions in a region different from the region where the live image is displayed as the display positions of the sample images. As a result, the sample images may be displayed not to overlap the live image. Thus, it is possible to prevent reduction in visibility of the live image due to the sample image.

The display position-setting unit 2026 may determine positions in the region where the live image is displayed, but not near a central position of the region (position indicated by a region A in FIG. 4A), as the display positions of the sample images. As a result, the sample images are displayed not to overlap with the central position of the region where the live image is displayed in the region where the live image is displayed. In many cases, a main subject to which the user pays attention is present at the central position of the region where the live image is displayed. Accordingly, it is possible to prevent reduction in visibility of a main subject of the live image due to the sample image.

The display position-setting unit 2026 may determine positions in the region where the live image is displayed, but not near a region where a main subject is displayed (position indicated by a region B in FIG. 4B), as the display positions of the sample images. For example, in a case where the image display terminal 20*l* includes a motion detection unit that detects a motion of a subject in a live image, positions in a region different from a region where a subject with a large motion is displayed are determined as the display positions of the sample images. Alternatively, positions in a region different from a region where a subject focused by an autofocus adjustment function of the imaging module 100 is displayed are determined as the display positions of the sample images. As a result, the sample images may be displayed not to overlap with a region where a main subject is displayed, in the region where the live image is displayed. Thus, it is possible to prevent reduction in visibility of a main subject of the live image due to the sample images.

After the display positions of the sample images are set, the live image is displayed in step S100. Since the processes of step S100 to S130 are already described, description thereof will not be repeated.

In FIG. 28, the setting of the display positions of the sample images (step S900) is initially performed, but a timing when the setting of the display positions of the sample images (step S900) is performed is not limited thereto. The setting of the display positions of the sample images (step S900) may be performed before the display of the sample images (step S115).

According to this embodiment, it is possible to control the display positions of the sample images.

Eleventh Embodiment

Figure 29:
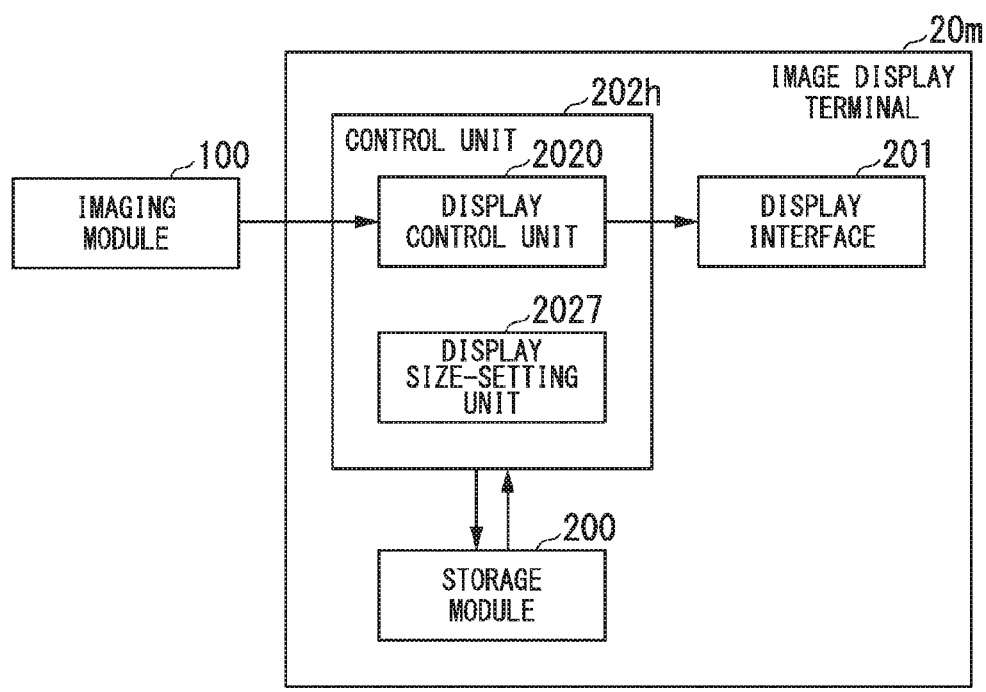
FIG. 29 is a block diagram illustrating a configuration of an image display terminal according to an eleventh embodiment of the invention.

Next, an eleventh embodiment of the invention will be described. FIG. 29 shows a configuration of an image display terminal 20*m* according to this embodiment. The image display terminal 20*m* includes the storage module 200, the display interface 201, and a control unit 202*h*. Description of the components already described above will not be repeated. The control unit 202*h* includes the display control unit 2020 and a display size-setting unit 2027. The display size-setting unit 2027 determines display sizes of sample images, and stores the determined display sizes in the storage module 200. The display control unit 2020 performs a control so that the display interface 201 displays the sample images according to the determined display sizes.

Figure 30:
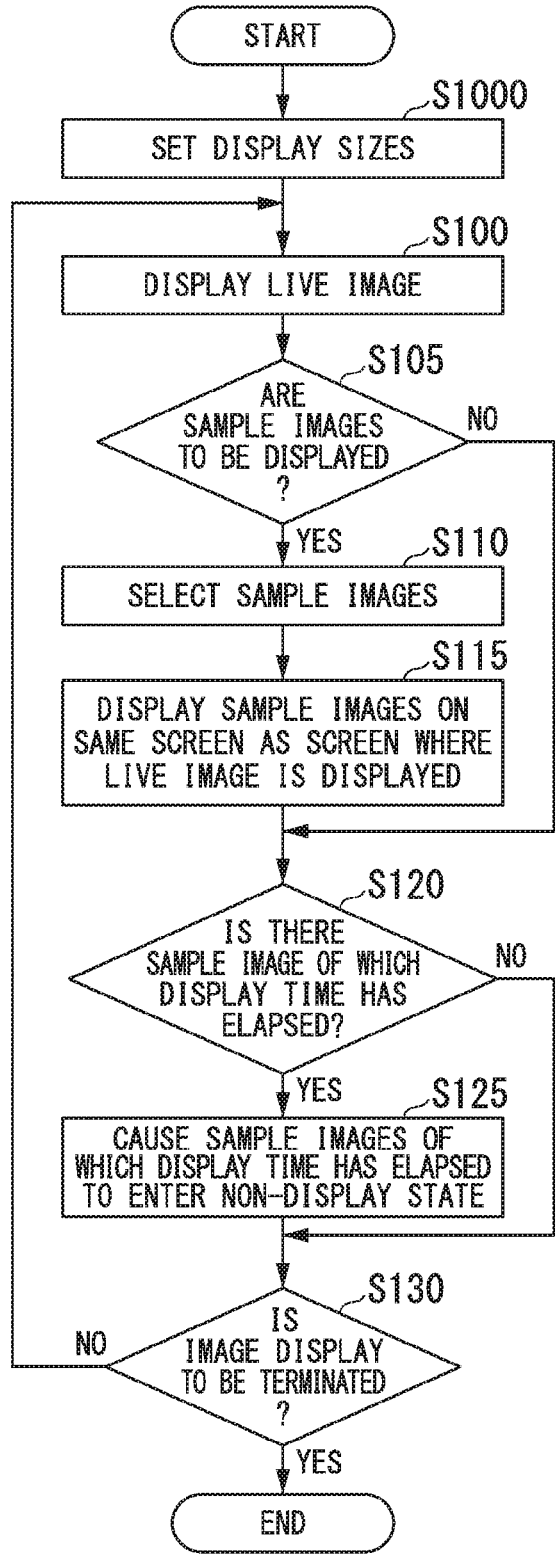
FIG. 30 is a flowchart illustrating a procedure of an operation of the image display terminal according to the eleventh embodiment of the invention.

Next, an operation of the image display terminal 20*m* will be described. FIG. 30 shows an example of a procedure of the operation of the image display terminal 20*m*. Hereinafter, different points compared with the operation shown in FIG. 3 will be described.

If an operation of displaying a live image is started, the display size-setting unit 2027 determines display sizes of sample images, and stores the determined display sizes in the storage module 200 (step S1000). Thus, the display sizes of the sample images are set. As a result, in step S115, the sample images are displayed according to the display sizes determined in step S1000.

The display size-setting unit 2027 may select display sizes of sample images regulated by a program, and may determine the selected display sizes as the display sizes of the sample images. Further, in a case where the image display terminal 20m includes the user interface 203, a user may select the display sizes of the sample images. In a case where the user selects the display sizes of the sample images, the display size-setting unit 2027 determines the display sizes of the sample images based on the display sizes selected by the user.

After the display sizes of the sample images are set, a live image is displayed in step S100. Since the processes of step S100 to S130 are already described, description thereof will not be repeated.

In FIG. 30, the setting of the display sizes of the sample images (step S1000) is initially performed, but a timing when the setting of the display sizes of the sample images (step S1000) is performed is not limited thereto. The setting of the display sizes of the sample images (step S1000) may be performed before the display of the sample images (step S115).

According to this embodiment, it is possible to control the display sizes of the sample images.

Twelfth Embodiment

Figure 31:
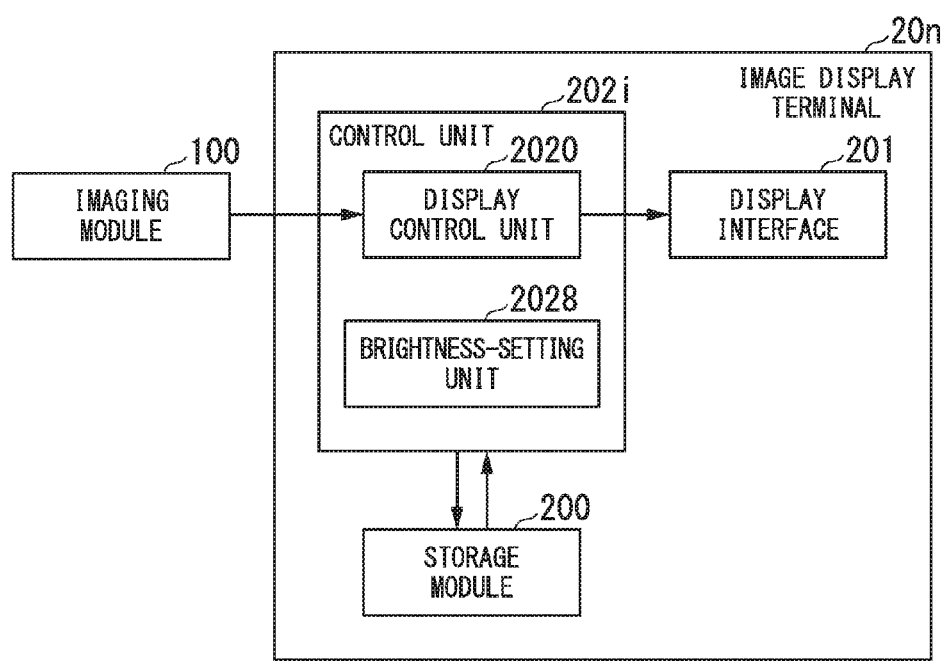
FIG. 31 is a block diagram illustrating a configuration of an image display terminal according to a twelfth embodiment of the invention.

Next, a twelfth embodiment of the invention will be described. FIG. 31 shows a configuration of an image display terminal 20n according to this embodiment. The image display terminal 20n includes the storage module 200, the display interface 201, and a control unit 202i. Description of the components already described above will not be repeated. The control unit 202i includes the display control unit 2020, and a brightness-setting unit 2028. The brightness-setting unit 2028 determines brightnesses of sample images, and stores the determined brightnesses in the storage module 200. The display control unit 2020 performs a control so that the display interface 201 displays the sample images according to the determined brightnesses.

Figure 32:
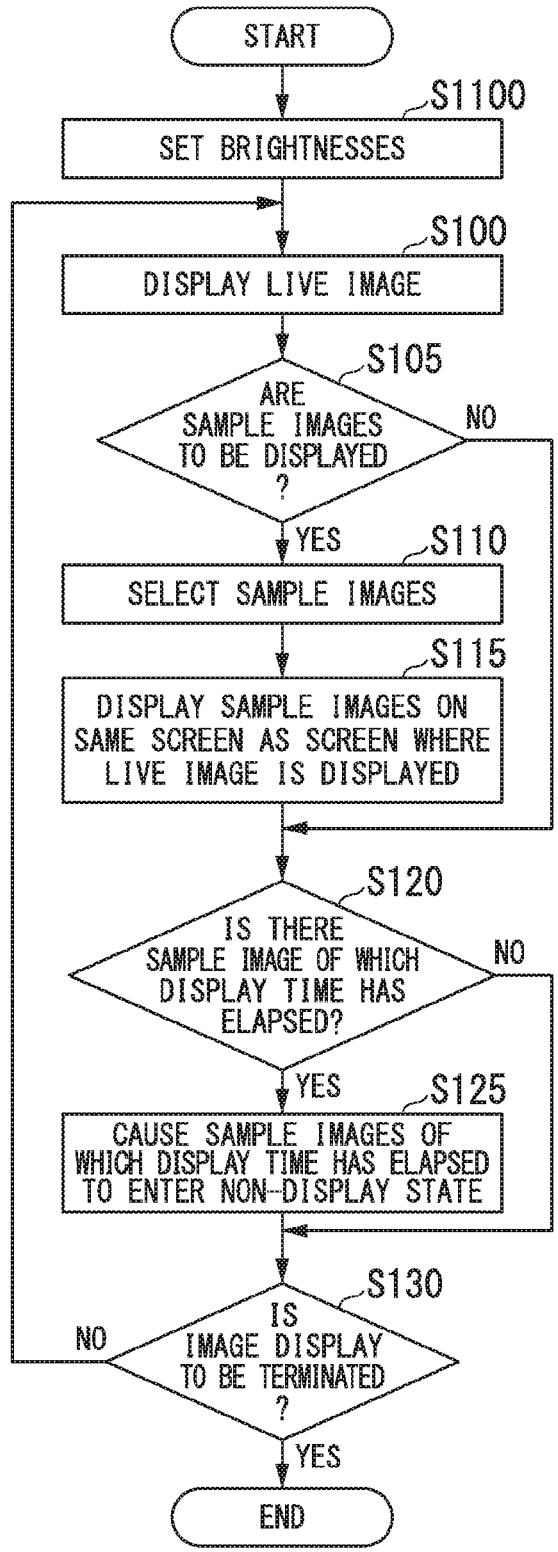
FIG. 32 is a flowchart illustrating a procedure of an operation of the image display terminal according to the twelfth embodiment of the invention.

Next, an operation of the image display terminal 20n will be described. FIG. 32 shows an example of a procedure of the operation of the image display terminal 20n. Hereinafter, different points compared with the operation shown in FIG. 3 will be described.

After an operation of displaying a live image is started, the brightness-setting unit 2028 determines brightnesses of sample images, and stores the determined brightnesses in the storage module 200 (step S1100). Thus, the brightnesses of the sample images are set. As a result, in step S115, the sample images are displayed according to the determined brightnesses in step S1100.

The brightness-setting unit 2028 may select brightnesses of sample images regulated in a program, and may determine the selected brightnesses as the brightnesses of the sample images. Further, in a case where the image display terminal 20n includes the user interface 203, a user may select the brightnesses of the sample images. In a case where the user selects the brightnesses of the sample images, the brightness-setting unit 2028 determines the brightnesses of the sample images based on the brightnesses selected by the user.

After the brightnesses of the sample images are set, a live image is displayed in step S100.

Since the processes of steps S100 to S130 are already described, description thereof will not be repeated.

In FIG. 32, the setting of the brightnesses of the sample images (step S1100) is initially performed, but a timing when the setting of the brightnesses of the sample images (step S1100) is performed is not limited thereto. The setting of the brightnesses of the sample images (step S1100) may be performed before the display of the sample images (step S115).

According to this embodiment, it is possible to control the brightnesses of the sample images.

Thirteenth Embodiment

Figure 33:
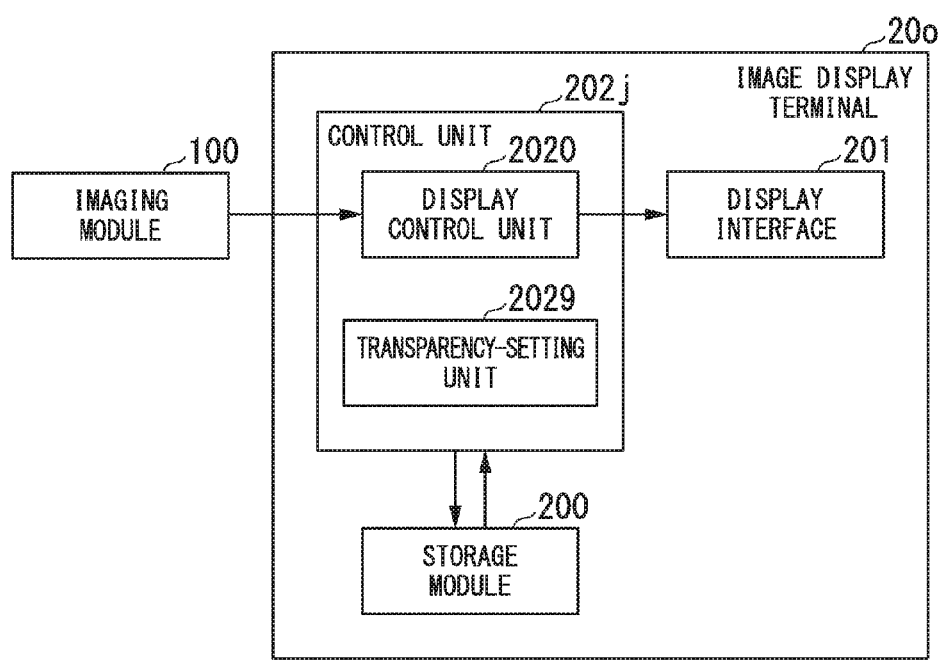
FIG. 33 is a block diagram illustrating a configuration of an image display terminal according to a thirteenth embodiment of the invention.

Next, a thirteenth embodiment of the invention will be described. FIG. 33 shows a configuration of an image display terminal 20o according to this embodiment. The image display terminal 20o includes the storage module 200, the display interface 201, and a control unit 202j. Description of the components already described above will not be repeated. The control unit 202j includes the display control unit 2020, and a transparency-setting unit 2029. The transparency-setting unit 2029 determines transparencies of sample images, and stores the determined transparencies in the storage module 200. The display control unit 2020 performs a control so that the display interface 201 displays the sample images according to the determined transparencies.

Figure 34:
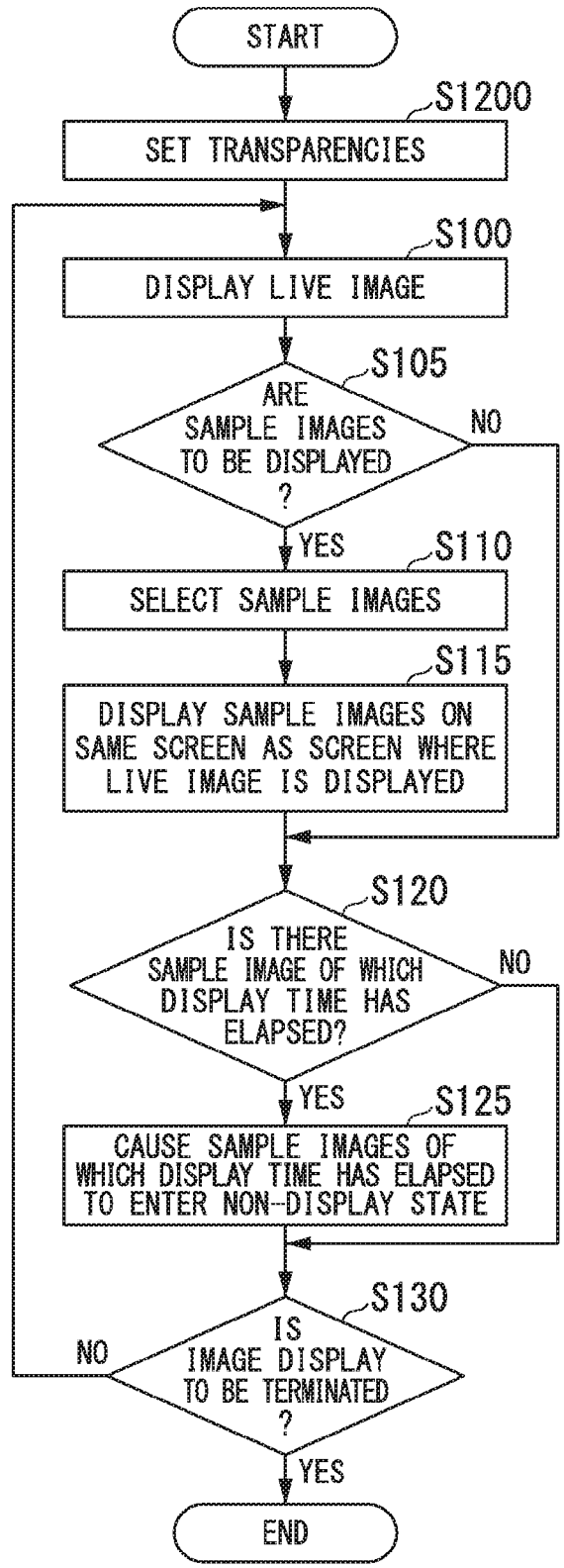
FIG. 34 is a flowchart illustrating a procedure of an operation of the image display terminal according to the thirteenth embodiment of the invention.

Next, an operation of the image display terminal 20o will be described. FIG. 34 shows an example of a procedure of the operation of the image display terminal 20o. Hereinafter, different points compared with the operation shown in FIG. 3 will be described.

After an operation of displaying a live image is started, the transparency-setting unit 2029 determines transparencies of sample images, and stores the determined transparencies in the storage module 200 (step S1200). Thus, the transparencies of the sample images are set. As a result, in step S115, the sample images are displayed according to the determined transparencies in step S1200.

The transparency-setting unit 2029 may select transparencies of a sample image regulated in a program, and may determine the selected transparencies as the transparencies of the sample images. Further, in a case where the image display terminal 20o includes the user interface 203, a user may select the transparencies of the sample images. In a case where the user selects the transparencies of the sample images, the transparency-setting unit 2029 determines the transparencies of the sample images based on the transparencies selected by the user.

After the transparencies of the sample images are set, a live image is displayed in step S100.

Since the processes of steps S100 to S130 are already described, description thereof will not be repeated.

In FIG. 34, the setting of the transparencies of the sample images (step S1200) is initially performed, but a timing when the setting of the transparencies of the sample images (step S1200) is performed is not limited thereto. The setting of the transparencies of the sample images (step S1200) has only to be performed before the display of the sample images (step S115).

According to this embodiment, it is possible to control the transparencies of the sample images.

Fourteenth Embodiment

Next, a fourteenth embodiment of the invention will be described. In this embodiment, the image display terminal 20a shown in FIG. 1 is used.

In this embodiment, the display control unit 2020 performs a control to be described hereinafter with respect to sample images which are being displayed. For example, the display control unit 2020 performs a control so that the display interface 201 displays sample images while changing display positions of the sample images which are being displayed. For example, the display control unit 2020 scrolls all the sample images which are being displayed from the right to the left. Alternatively, the display control unit 2020 linearly moves all the sample images which are being displayed outwardly from the screen of the display interface 201.

Alternatively, the display control unit 2020 performs a control so that the display interface 201 displays the sample images while fading in or out the sample images. For example, when displaying the sample images on the screen of the display interface 201, the display control unit 2020 performs a control for fading in the sample images. Further, when deleting the sample images from the screen of the display interface 201, the display control unit 2020 performs a control for fading out the sample images.

Alternatively, the display control unit 2020 performs a control so that the display interface 201 displays the sample images while increasing or decreasing sizes of the sample images which are being displayed. The enlargement and reduction of the sample images refer to increase and decrease in display sizes. That is, the display control unit 2020 controls display sizes of the sample images which are being displayed. For example, when displaying the sample images on the screen of the display interface 201, the display control unit 2020 performs a control for increasing the sizes of the sample images from a minimum size to a predetermined size. Further, when deleting the sample images from the screen of the display interface 201, the display control unit 2020 performs a control for decreasing the sizes of the sample images from a predetermined size to a minimum size.

Alternatively, the display control unit 2020 performs a control so that the display interface 201 displays information (additional information) relating to sample images together with the sample images. The information relating to the sample images is information indicating whether or not the sample images are sample images capable of being captured in a current system, for example. The determination of whether or not the sample images are capable of being captured in the current system is performed by the method described in the modification example of the ninth embodiment, for example. The information relating to the sample images may be advice relating to imaging. The advice relating to the imaging may be information relating to a composition such as an imaging angle or an angle of view, or may be information relating to imaging setting such as a shutter speed. The information relating to the sample images may be positional information in imaging, acquired from a global positioning system (GPS) or the like.

Alternatively, the display control unit 2020 performs a control so that the display interface 201 displays a time (a first time) until sample images which are being displayed enter into a non-display state or a time (a second time) elapsed from a time point when the sample images which are being displayed are displayed. For example, the display control unit 2020 performs a control so that the display interface 201 displays the first time or the second time using characters, figures, or the like.

Alternatively, the display control unit 2020 performs a control so that the display interface 201 displays sample images processed based on the first time or the second time. For example, in a case where the first time is within a predetermined time or in a case where the second time exceeds the predetermined time, the display control unit 2020 changes brightnesses of the sample images. In such a case, the display control unit 2020 may flash the sample images, for example.

In a case where the image display terminal 20a includes the user interface 203, a user may select content of a control with respect to sample images which are being displayed. In a case where the user selects the content of the control with respect to the sample images which are being displayed, the display control unit 2020 performs a control with respect to the sample images which are being displayed based on the content of the control selected by the user.

According to this embodiment, it is possible to perform a control of effects with respect to sample images which are being displayed or a display of additional information with respect to the sample images.

Fifteenth Embodiment

Figure 35:
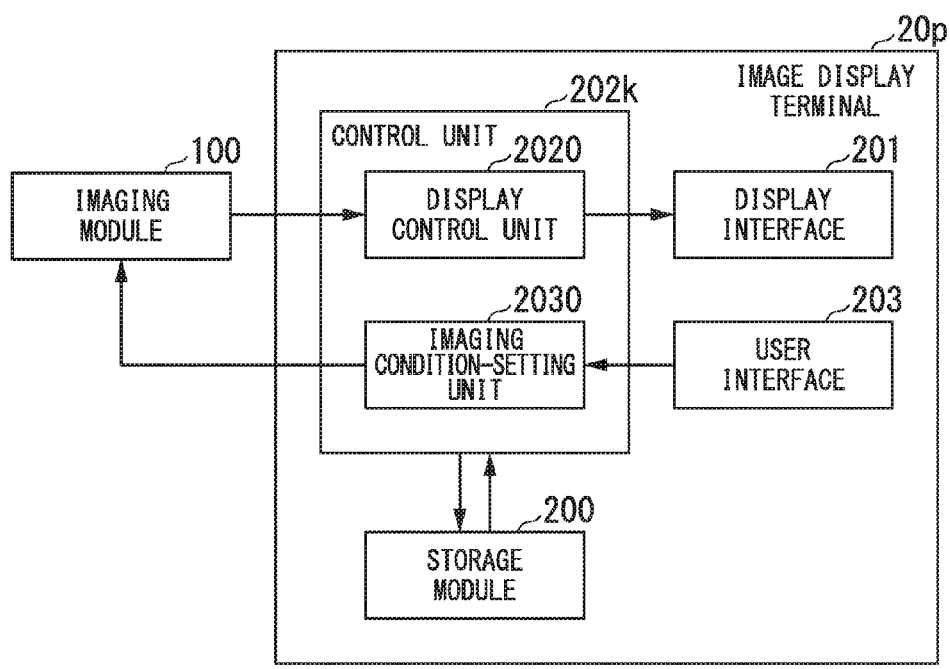
FIG. 35 is a block diagram illustrating a configuration of an image display terminal according to a fifteenth embodiment of the invention.

Next, a fifteenth embodiment of the invention will be described. FIG. 35 shows a configuration of an image display terminal 20p according to this embodiment. The image display terminal 20p includes the storage module 200, the display interface 201, a control unit 202k, and the user interface 203. Description of the components already described above will not be repeated. The control unit 202k includes the display control unit 2020 and an imaging condition-setting unit 2030. The storage module 200 stores imaging conditions information (imaging parameters) indicating imaging conditions when sample images are captured in association with the sample images. In a case where a user's operation received through the user interface 203 is an operation of selecting sample images which are being displayed, the imaging condition-setting unit 2030 sets imaging conditions indicated by the imaging conditions information corresponding to the selected sample images for the imaging module 100. In this embodiment, the imaging conditions information is an Exif, for example, and includes a focal distance, a shutter speed, sensitivity information, or the like.

Figure 36:
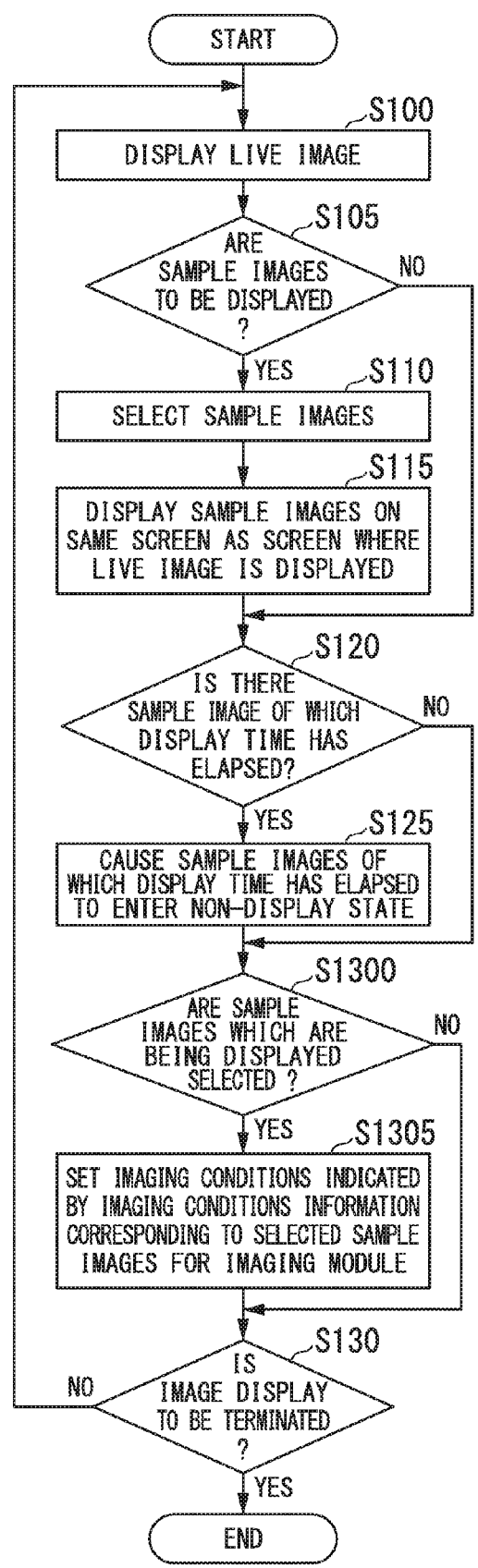
FIG. 36 is a flowchart illustrating a procedure of an operation of an image display terminal according to a fifteenth embodiment of the invention.

Next, an operation of the image display terminal 20p will be described. FIG. 36 shows an example of a procedure of the operation of the image display terminal 20p. Hereinafter, different points compared with the operation shown in FIG. 3 will be described.

After the sample images enter a non-display state in step S115, the imaging condition-setting unit 2030 determines whether or not an instruction for selecting the sample images which are being displayed is input, that is, whether or not the sample images which are being displayed are selected through the user interface 203 (step S1300). In a case where the sample images which are being displayed are not selected, the process of step S130 is performed. In a case where the sample images which are being displayed are selected, the imaging condition-setting unit 2030 reads imaging conditions information corresponding to the selected sample images from the storage module 200, and sets imaging conditions indicated by the read imaging conditions information for the imaging module 100 (step S1305).

After the imaging conditions are set, the process of step S130 is performed. Since the processes of step S100 to S130 are already described, description thereof will not be repeated.

In FIG. 36, timings when the determination of whether or not the sample images are selected (step S1300) and the setting of the imaging conditions (step S1305) are performed are not limited the timings shown in the figure. The determination of whether or not the sample images are selected (step S1300) and the setting of the imaging conditions (step S1305) may be performed before or after an arbitrary process shown in FIG. 36.

According to this embodiment, it is possible to set imaging conditions when selected sample images are captured for the imaging module 100.

Sixteenth Embodiment

Figure 37:
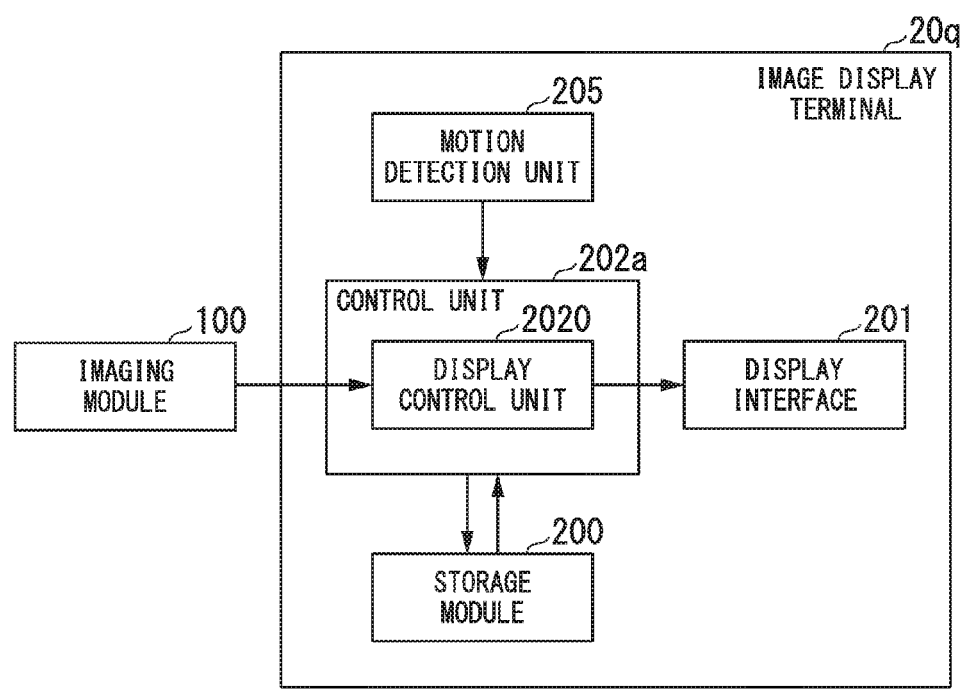
FIG. 37 is a block diagram illustrating a configuration of an image display terminal according to a sixteenth embodiment of the invention.

Next, a sixteenth embodiment of the invention will be described. FIG. 37 shows a configuration of an image display terminal 20q according to this embodiment. The image display terminal 20q includes the storage module 200, the display interface 201, the control unit 202a, and a motion detection unit 205. Description of the components already described above will not be repeated. The motion detection unit 205 is a terrestrial magnetism sensor, an acceleration sensor, or the like, and detects an orientation or a motion of the host terminal (image display terminal 20q).

In this embodiment, the display control unit 2020 performs a control so that the display interface 201 displays the sample images while changing display positions of the sample images which are being displayed, according to the detected orientation or motion. For example, in a case where a user tilts the image display terminal 20q, the display control unit 2020 performs a control so that the display interface 201 displays the sample images while changing display positions of the sample images which are being displayed according to an orientation (inclination angle or the like) or a motion (acceleration or the like) of the image display terminal 20q. As the inclination of the image display terminal 20q becomes larger, or as the motion of the image display terminal 20q becomes larger, movement speeds of the sample images may be faster.

Alternatively, the display control unit 2020 performs a control so that the display interface 201 causes sample images which are being displayed to enter a non-display state according to the detected orientation or motion. For example, in a case where a user shakes the image display terminal 20q, if a maximum value of values relating to the orientation or motion of the image display terminal 20q (inclination angle, acceleration, or the like) exceeds a predetermined value, the display control unit 2020 performs a control for causing all the sample images which are being displayed to enter the non-display state.

According to this embodiment, it is possible to reduce workload of a user relating to an operation for changing states of sample images which are being displayed.

Other Modification Examples

Next, other modification examples which are not described in the above-described respective embodiments will be described. Instead of displaying sample images, icons (which may be signs or figures), characters, link information, or the like may be displayed. After the icons instead of the sample images are displayed, for example, when an operation of selecting the displayed icons is performed, the sample images are displayed. Alternatively, after the characters instead of the sample images are displayed, for example, search keywords are displayed, and when an operation of selecting the search keywords is performed, search query information based on the selected search keywords is generated. The link information is information indicating a uniform resource locator (URL) of an external device that retains images. For example, the link information is characters, signs, figures, icons, or the like associated with the URL. After the link information instead of the sample images is displayed, for example, when an operation of selecting the displayed link information is performed, images are acquired from the external device indicated by the link information, and the acquired images are displayed as the sample images.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An image display terminal, comprising:
a memory configured to store a plurality of sample images and a display time corresponding to each of the plurality of sample images;
a display interface configured to display live images continuously output from an imaging module and the sample images stored in the memory; and
a display control unit, wherein
the display control unit performs a control to cause the live images to be displayed on the display interface, and cause a first image of the plurality of sample images to be displayed on the display interface for the display time corresponding to the first image, and
when the display time corresponding to the first image has elapsed, the display control unit performs a control to cause the first image which is being displayed on the display interface to be non-displayed, and cause a second image of the plurality of sample images, which is different from the first image and non-displayed, to be displayed on the displayer interface for the display time corresponding to the second image,
wherein the plurality of sample images are images shown to a user of the imaging module and the plurality of sample images are used as reference images for assisting an imaging action by the user, and
wherein the display interface is configured to display both the first image and the live images on a same screen simultaneously during the display time corresponding to the first image, and the display interface is configured to display both the second image and the live images on the same screen simultaneously during the display time corresponding to the second image.

2. The image display terminal according to claim 1, further comprising:
a display time-setting unit configured to determine the display time and stores the determined display time in the memory.

3. The image display terminal according to claim 2, further comprising:
an user interface configured to receive an operation of a user, wherein the display time-setting unit determines the display time according to the operation of the user and stores the determined display time in the memory.

4. The image display terminal according to claim 3, wherein in a case where the operation of the user is an operation of selecting the sample image, the display time-setting unit determines the display time of the selected sample image and stores the determined display time in the memory in association with the selected sample image.

5. The image display terminal according to claim 1, further comprising:
an user interface configured to receive an operation of a user,
wherein in a case where the operation of the user is an operation of selecting the sample images which are being displayed, the display control unit performs a control to cause the selected sample images which are being displayed on the display interface to be non-displayed.

6. The image display terminal according to claim 1, further comprising:
an user interface configured to receive an operation of a user,
wherein the display control unit performs a control to cause all the sample images which are being displayed on the display interface to be non-displayed, in a case where the operation of the user is an operation of instructing non-display of the sample images.

7. The image display terminal according to claim 1, further comprising:
an user interface configured to receive an operation of a user,
wherein in a case where the operation of the user is an operation of selecting the sample images which are being displayed, the display control unit performs a control to cause the selected sample images which are being displayed to be displayed even after the display time has elapsed.

8. The image display terminal according to claim 1, further comprising:
a time measurement unit configured to measure a period of time when the sample image is displayed only while the live image is being displayed,
wherein the display control unit determines whether or not the display time has elapsed based on the period of time measured by the time measurement unit.

9. The image display terminal according to claim 1, further comprising:
a searching unit configured to generate search query information indicating an image searching condition; and
a communication interface configured to transmit the search query information to an external device and receives a search result image searched based on the search query information from the external device,
wherein the memory stores the received search result image as the sample image.

10. The image display terminal according to claim 9, further comprising:
a display time-setting unit configured to determine the display times based on the number of the search result images and stores the determined display times in the memory.

11. The image display terminal according to claim 10, wherein the display time-setting unit determines the display time for each of the sample images to be shorter as the number of the search result images becomes larger.

12. The image display terminal according to claim 10, wherein the display time-setting unit determines the display times of the sample images to be zero in a case where the number of the search result images is smaller than a predetermined number.

13. The image display terminal according to claim 9, wherein the display control unit performs a control to cause a larger number of the sample images to be simultaneously displayed, in a case where the number of the search result images becomes larger.

14. The image display terminal according to claim 9, wherein the display control unit performs a control to cause any one of the sample images which are being displayed to be selected, based on a result obtained by comparing identification information of the sample images which are being displayed with identification information of the sample images stored in the memory by searching, and performs a control to cause the selected sample image to be non-displayed and the sample images stored in the memory by searching to be displayed on the display interface for the display times.

15. The image display terminal according to claim 9, wherein the searching unit generates the search query information whenever a first predetermined time has elapsed, and
wherein the communication interface transmits the search query information to an external device whenever a second predetermined time has elapsed.

16. The image display terminal according to claim 9, further comprising:
an user interface configured to receive an operation of a user,
wherein in a case where the operation of the user is an operation of designating an image searching condition, the searching unit generates the search query information based on the designated image searching condition.

17. The image display terminal according to claim 16, wherein the display control unit performs a control to display the image searching condition together with the live image to be displayed on the display interface.

18. The image display terminal according to claim 9, further comprising:
an user interface configured to receive an operation of a user,
wherein in a case where the operation of the user is an operation of selecting the sample image which is being displayed, the searching unit generates the search query information for searching an image similar to the selected sample image.

19. The image display terminal according to claim 9, further comprising:
an user interface configured to receive an operation of a user,
wherein in a case where the operation of the user is an operation of selecting the sample image which is being displayed, the searching unit stores search query information indicating an image searching condition that the selected sample image is searched in the memory in association with the selected sample image, and
in a case where the operation of the user is an operation of designating an image searching condition, the searching unit searches the sample image corresponding to the search query information indicating the designated image searching condition from the sample images stored in the memory.

20. The image display terminal according to claim 1, further comprising:
    an image selection unit configured to select the sample image to display from the sample images stored in the memory,
    wherein the display control unit performs a control to cause the selected sample image to be displayed on the display interface.

21. The image display terminal according to claim 20, wherein in a case where a plurality of identical sample images is stored in the memory, the image selection unit selects one sample image from among the plurality of identical sample images.

22. The image display terminal according to claim 20, wherein in a case where a plurality of similar sample images is stored in the memory, the image selection unit selects one sample image from among the plurality of similar sample images.

23. The image display terminal according to claim 20, wherein the memory stores imaging conditions information indicating imaging conditions when the sample images are captured in association with the sample images, and
    the image selection unit selects only the sample images corresponding to the imaging conditions information indicating imaging conditions which can apply to the imaging module from among the imaging conditions information stored in the memory.

24. The image display terminal according to claim 1, further comprising:
    a display position-setting unit configured to determine display positions of the sample images and stores the determined display positions in the memory,
    wherein the display control unit performs a control to cause the sample images to be displayed at the determined display positions on the display interface.

25. The image display terminal according to claim 24, wherein the display position-setting unit determines positions in a region different from a region where the live image is displayed as the display positions of the sample images.

26. The image display terminal according to claim 24, wherein the display position-setting unit determines positions in a region where the live image is displayed but not near a central position of the region, as the display positions of the sample images.

27. The image display terminal according to claim 24, wherein the display position-setting unit determines positions in a region where the live image is displayed, but not near a region where a main subject is displayed, as the display positions of the sample images.

28. The image display terminal according to claim 1, wherein the display control unit performs a control to cause information relating to the sample images together with the sample images to be displayed on the display interface.

29. The image display terminal according to claim 1, wherein the display control unit performs a control to display a first time or a second time on the display interface, wherein the first time is a time until the sample image which is being displayed becomes non-displayed, and the second time is a time elapsed from a time point when the sample image is displayed.

30. The image display terminal according to claim 29, wherein the display control unit performs a control to cause the sample images processed based on the first time or the second time to be displayed on the display interface.

31. The image display terminal according to claim 1, wherein the memory stores imaging conditions information indicating imaging conditions when the sample images are captured in association with the sample images, and
    the image display terminal further comprises:
    an user interface that receives an operation of a user; and
    an imaging condition-setting unit that sets imaging conditions indicated by the imaging conditions information corresponding to the selected sample image for the imaging module, in a case where the operation of the user is an operation of selecting the sample image which is being displayed.

32. The image display terminal according to claim 1, further comprising:
    an user interface configured to receive an operation of a user,
    wherein in a case where the operation of the user is an operation of selecting the sample image which is being displayed, the display control unit performs a control to cause advice for capturing the selected sample image to be displayed on the display interface.

33. The image display terminal according to claim 1, further comprising:
    an user interface configured to receive an operation of a user,
    wherein the display control unit performs a control to cause the sample image which is non-displayed to be displayed on the display interface, in a case where the operation of the user is an operation of instructing re-display of the sample image which is in the non-displayed.

34. The image display terminal according to claim 33, wherein the display control unit performs a control to cause a list of the plurality of sample images which are non-displayed to be displayed on the display interface, in a case where the operation of the user is an operation of instructing re-display of the plurality of sample images which are non-displayed.

35. The image display terminal according to claim 33, wherein the display control unit performs a control to cause the sample image which is non-displayed most recent to be displayed on the display interface, in a case where the operation of the user is an operation of instructing re-display of the sample image which is non-displayed.

36. The image display terminal according to claim 1, further comprising:
    an user interface configured to receive an operation of a user,
    wherein the display control unit performs a control to cause the sample image which is being displayed to be non-displayed, in a case where the operation of the user is an operation of instructing autofocus.

37. The image display terminal according to claim 1, further comprising:
    a motion detection unit configured to detect an orientation or a motion of the image display terminal,
    wherein the display control unit performs a control to cause the sample images to be displayed on the display interface while changing display positions of the sample images which are being displayed, according to the detected orientation or motion.

38. The image display terminal according to claim 1, further comprising:
a motion detection unit configured to detect an orientation or a motion of the image display terminal,
wherein the display control unit performs a control to cause the sample images which are being displayed on the display interface to be non-displayed according to the detected orientation or motion.

39. The image display terminal according to claim 1, further comprising:
an imaging module configured to continuously capture the live images.

40. The image display terminal according to claim 1, further comprising:
a number determination unit configured to determine the number of sample images to be simultaneously displayed and stores the determined number in the memory,
wherein the display control unit performs a control to cause the determined number of sample images to be displayed on the display interface.

41. The image display terminal according to claim 1, further comprising:
a display size determination unit configured to determine display sizes of the sample images and stores the determined display sizes in the memory,
wherein the display control unit performs a control to cause the sample images in the determined display sizes to be displayed on the display interface.

42. The image display terminal according to claim 1, further comprising:
a brightness determination unit configured to determine brightness of the sample images and stores the determined brightnesses in the memory,
wherein the display control unit performs a control to cause the sample images at the determined brightness to be displayed on the display interface.

43. The image display terminal according to claim 1, further comprising:
a transparency determination unit configured to determine transparencies of the sample images and stores the determined transparency in the memory,
wherein the display control unit performs a control to cause the sample images at the determined transparencies to be displayed on the display interface.

44. The image display terminal according to claim 1, wherein the display control unit performs a control to cause the sample images to be displayed on the display interface while changing display positions of the sample images which are being displayed.

45. The image display terminal according to claim 1, wherein the display control unit performs a control to cause the sample images to be displayed on the display interface with effect of fading in or fading out the sample images.

46. The image display terminal according to claim 1, wherein the display control unit performs a control to cause the sample images be displayed on the display interface with effect of enlarging or reducing the sample images which are being displayed.

47. An image display method comprising the steps of:
displaying live images continuously output from an imaging module on a display interface;
displaying each of a plurality of sample images stored in a memory on the display interface for a display time corresponding to each of the plurality of sample images, in a state where the plurality of sample images and the display time corresponding to each of the plurality of sample images are stored in the memory;
causing the sample images which are being displayed to be non-displayed on the display interface, after the display time has elapsed; and
displaying other sample images different from the sample images which are non-displayed on the display interface for the display time,
wherein the plurality of sample images are images shown to a user of the imaging module and the plurality of sample images are used as reference images for assisting an imaging action by the user, and
wherein each of the plurality of sample images and the live images are displayed on a same screen simultaneously during the display time.

48. A non-transitory computer readable recording medium storing a program causing a computer to execute the steps of:
displaying live images continuously output from an imaging module;
displaying each of a plurality of sample images stored in a memory for display time corresponding to each of the plurality of sample images, in a state where the plurality of sample images and the display time corresponding to each of the plurality of sample images are stored in the memory;
causing the sample images which are being displayed to be non-displayed, after the display time has elapsed; and
displaying other sample images different from the sample images which are non-displayed for the display time,
wherein the plurality of sample images are images shown to a user of the imaging module and the plurality of sample images are used as reference images for assisting an imaging action by the user, and
wherein each of the plurality of sample images and the live images are displayed on a same screen simultaneously during the display time.

* * * * *